United States Patent
Kim et al.

(10) Patent No.: US 9,635,353 B2
(45) Date of Patent: Apr. 25, 2017

(54) METHODS AND APPARATUSES FOR ENCODING AND DECODING VIDEO

(71) Applicant: SAMSUNG ELECTRONICS CO., LTD., Suwon-si (KR)

(72) Inventors: Sung-oh Kim, Suwon-si (KR); Chan-sik Park, Hwaseong-si (KR); Young-ho Moon, Suwon-si (KR); Kyo-hyuk Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 409 days.

(21) Appl. No.: 14/218,177

(22) Filed: Mar. 18, 2014

(65) Prior Publication Data

US 2014/0269924 A1 Sep. 18, 2014

(30) Foreign Application Priority Data

Mar. 15, 2013 (KR) .................. 10-2013-0028245

(51) Int. Cl.
| | | |
|---|---|---|
| H04N 7/12 | (2006.01) |
| H04N 19/105 | (2014.01) |
| H04N 19/52 | (2014.01) |
| H04N 19/176 | (2014.01) |
| H04N 19/157 | (2014.01) |

(52) U.S. Cl.
CPC ..... *H04N 19/00024* (2013.01); *H04N 19/105* (2014.11); *H04N 19/157* (2014.11); *H04N 19/176* (2014.11); *H04N 19/52* (2014.11)

(58) Field of Classification Search
CPC ........... H04N 19/00024; H04N 19/105; H04N 19/157; H04N 19/176; H04N 19/52
USPC ....................... 375/240.01–240.29
See application file for complete search history.

(56) References Cited

U.S. PATENT DOCUMENTS

| | | | | |
|---|---|---|---|---|
| 8,311,118 B2* | 11/2012 | Lee | ......... | H04N 19/52 |
| | | | | 375/240.01 |
| 2013/0016787 A1* | 1/2013 | Kim | ..... | H04N 19/176 |
| | | | | 375/240.16 |
| 2013/0128978 A1* | 5/2013 | Yie | ..... | H04N 19/176 |
| | | | | 375/240.16 |
| 2013/0148729 A1* | 6/2013 | Sasai | ..... | H04N 19/70 |
| | | | | 375/240.12 |
| 2013/0177076 A1* | 7/2013 | Itani | ..... | H04N 19/105 |
| | | | | 375/240.03 |
| 2013/0208799 A1* | 8/2013 | Srinivasamurthy | ......... | |
| | | | | H04N 19/00696 |
| | | | | 375/240.16 |

* cited by examiner

*Primary Examiner* — Gims Philippe
(74) *Attorney, Agent, or Firm* — Sughrue Mion, PLLC

(57) ABSTRACT

Provided are methods and apparatuses for performing motion estimation encoding and decoding on a video. A method of encoding a video includes splitting a picture by using a maximum coding unit; splitting the maximum coding unit into prediction units, according to a split mode indicating a split form of the maximum coding unit; performing motion estimation on a prediction unit having a size equal to or less than a predetermined size from among the prediction units included in the maximum coding unit, and obtaining a motion vector of the prediction unit having the size equal to or less than the predetermined size; and obtaining a motion vector of a prediction unit having a size greater than the predetermined size, by using the motion vector of the prediction unit having the size equal to or less than the predetermined size.

12 Claims, 20 Drawing Sheets

FIG. 7
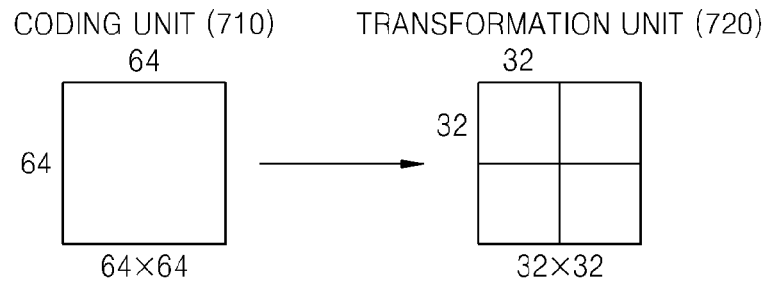
FIG. 8
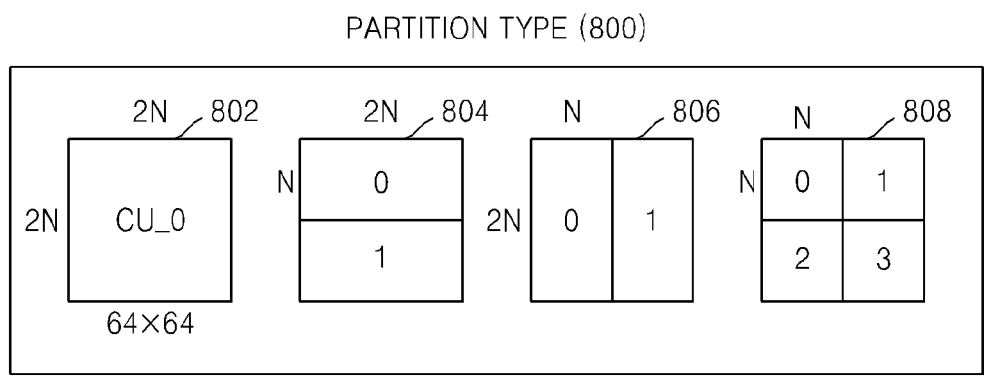
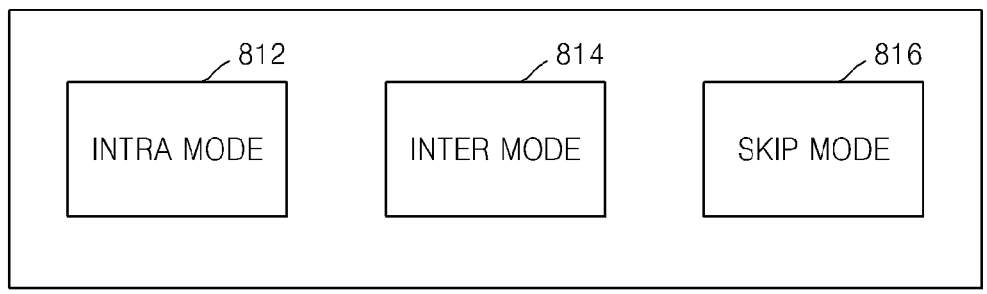
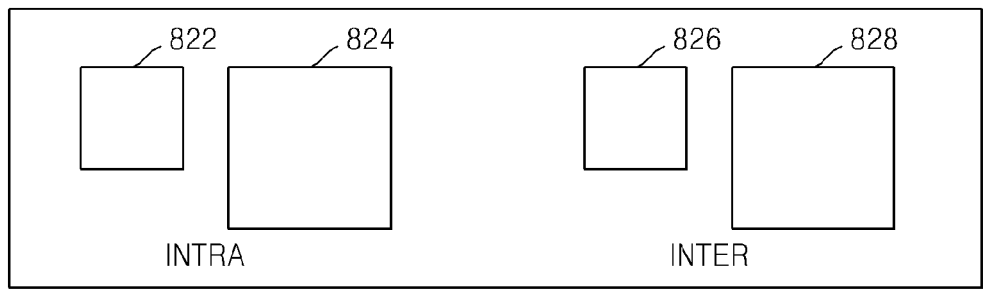

CODING UNITS (1010)

PREDICTION UNITS (1060)

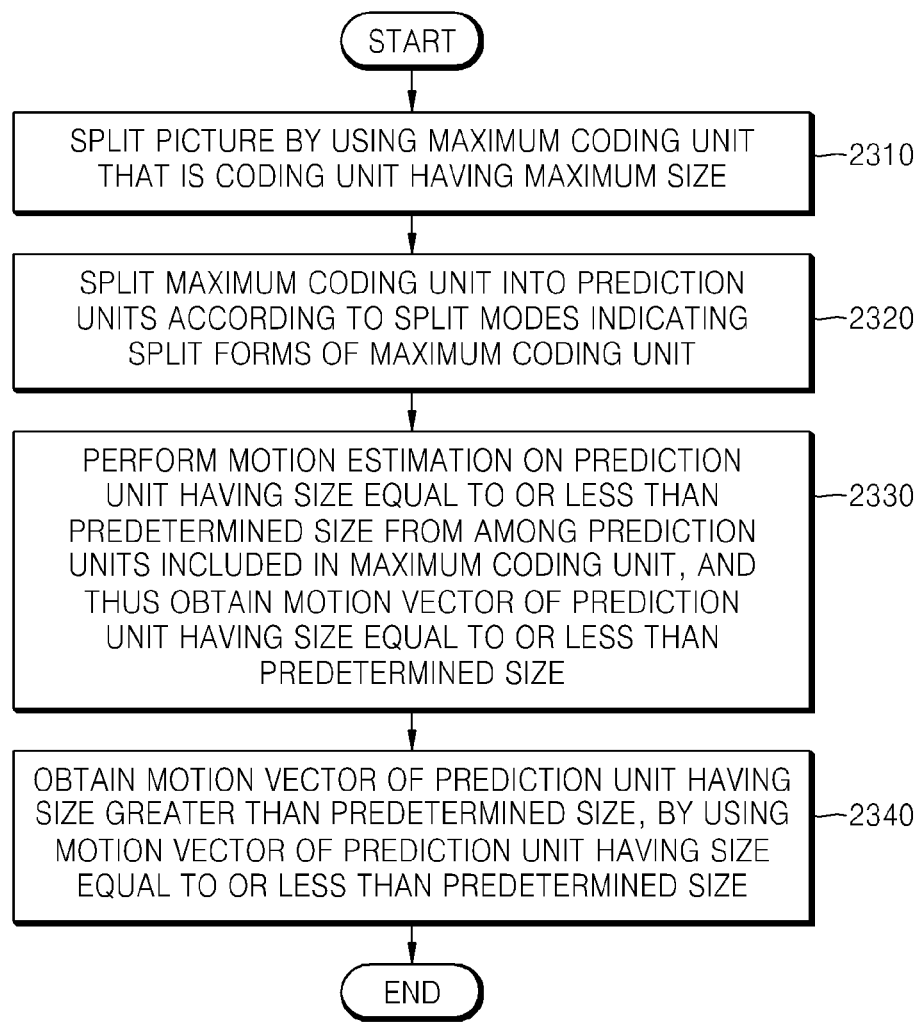
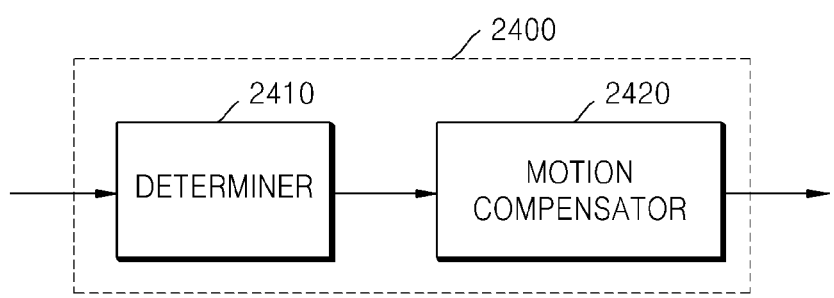

METHODS AND APPARATUSES FOR ENCODING AND DECODING VIDEO

CROSS REFERENCE TO RELATED APPLICATION

This application claims priority from Korean Patent Application No. 10-2013-0028245, filed on Mar. 15, 2013, in the Korean Intellectual Property Office, the disclosure of which is incorporated herein in its entirety by reference.

BACKGROUND

1. Field

Apparatuses and methods consistent with exemplary embodiments relate to video encoding and decoding, and more particularly, to video encoding and decoding in which a motion vector of a block is efficiently determined.

2. Description of the Related Art

When encoding a video, a picture is split into data units such as macroblocks. Each of the macroblocks is prediction-encoded by using an inter prediction method or an intra prediction method.

The inter prediction method uses motion estimation and compensation to compress an image by removing a temporal redundancy between pictures. During the motion estimation and compensation, a reference block that is most similar to a current block is searched for in a predetermined search range by using an evaluation function, and data of the searched reference block that is most similar to the current block is obtained.

According to a related art video codec such as H.264, a macroblock having a size of 16×16 is split into blocks having sizes of 16×16 through 4×4, and a motion vector of each of the blocks is determined by performing motion estimation on each of the blocks.

SUMMARY

One or more exemplary embodiments provide methods and apparatuses for encoding and decoding a video with decreased computation during motion estimation by limiting a size of a target data unit that is actually motion-estimated, when the motion estimation is performed by splitting a larger data unit.

According to an aspect of an exemplary embodiment, there is provided a method of encoding a video, the method comprising: splitting a picture included in the video, by using a maximum coding unit that is a coding unit having a maximum size; splitting the maximum coding unit into prediction units in a hierarchical structure, according to a split mode indicating a split form of the maximum coding unit; performing motion estimation on a prediction unit having a size equal to or less than a predetermined size from among the prediction units included in the maximum coding unit and obtaining a motion vector of the prediction unit having the size equal to or less than the predetermined size; and obtaining a motion vector of a prediction unit having a size greater than the predetermined size, by using the motion vector of the prediction unit having the size equal to or less than the predetermined size.

According to an aspect of another exemplary embodiment, there is provided a method of decoding a video, the method comprising: obtaining, from a bitstream, flag information indicating whether a motion vector of a prediction unit having a size equal to or less than a predetermined size is used as a motion vector of a prediction unit that has a size greater than the predetermined size and is from among prediction units included in a maximum coding unit, and size information of a current prediction unit; determining whether the motion vector of the prediction unit having the size equal to or less than the predetermined size is used as the motion vector of the prediction unit having the size greater than the predetermined size based on the flag information; and when the motion vector of the prediction unit having the size equal to or less than the predetermined size is used as the motion vector of the prediction unit having the size greater than the predetermined size, and when the current prediction unit is the prediction unit having the size greater than the predetermined size, obtaining a motion vector of the current prediction unit by using the motion vector of the prediction unit that has the size equal to or less than the predetermined size and is from among the prediction units included in the maximum coding unit.

According to an aspect of still another exemplary embodiment, there is provided an image encoder for encoding a video, the image encoder comprising: a splitter configured to split a picture included in the video, by using a maximum coding unit that is a coding unit having a maximum size, and splitting the maximum coding unit into prediction units in a hierarchical structure, according to a split mode indicating a split form of the maximum coding unit; and a motion estimation performing unit configured to perform motion estimation on a prediction unit having a size equal to or less than a predetermined size from among the prediction units included in the maximum coding unit, configured to obtain a motion vector of the prediction unit having the size equal to or less than the predetermined size, and configured to obtain a motion vector of a prediction unit having a size greater than the predetermined size, by using the motion vector of the prediction unit having the size equal to or less than the predetermined size.

According to an aspect of still another exemplary embodiment, there is provided an image decoder for decoding a video, the image decoder comprising: a determiner configured to obtain, from a bitstream, flag information indicating whether a motion vector of a prediction unit having a size equal to or less than a predetermined size is used as a motion vector of a prediction unit that has a size greater than the predetermined size and is from among prediction units included in a maximum coding unit, and size information of a current prediction unit, and based on the flag information, configured to determine whether the motion vector of the prediction unit having the size equal to or less than the predetermined size is used as the motion vector of the prediction unit having the size greater than the predetermined size; and a motion compensator configured to, according to a result of the determining, when the motion vector of the prediction unit having the size equal to or less than the predetermined size is used as the motion vector of the prediction unit having the size greater than the predetermined size, and when the current prediction unit is the prediction unit having the size greater than the predetermined size, obtain a motion vector of the current prediction unit by using the motion vector of the prediction unit that has the size equal to or less than the predetermined size and is from among the prediction units included in the maximum coding unit.

BRIEF DESCRIPTION OF THE DRAWINGS

These and/or other aspects will become apparent and more readily appreciated from the following description of exemplary embodiments, taken in conjunction with the accompanying drawings in which:

FIG. 7 is a diagram for describing a relationship between a coding unit and transformation units, according to an embodiment;

FIG. 8 is a diagram for describing encoding information of coding units corresponding to a coded depth, according to an embodiment;

FIG. 23 is a flowchart of a method of encoding a video, according to an embodiment;

FIG. 24 is a block diagram illustrating a configuration of a motion compensating apparatus, according to an embodiment.

DETAILED DESCRIPTION

Hereinafter, one or more embodiments will be described in detail by explaining exemplary embodiments with reference to the attached drawings.

Figure 1:
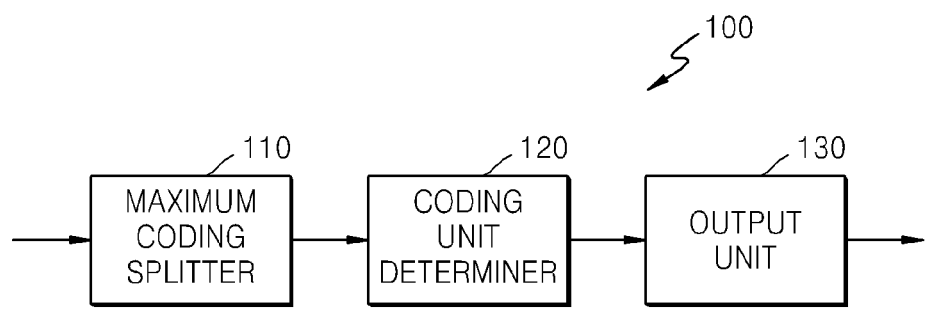
FIG. 1 is a block diagram of an apparatus for encoding a video, according to an embodiment.

FIG. 1 is a block diagram of a video encoding apparatus 100, according to an embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. When the current picture is larger than the maximum coding unit, image data of the current picture may be split into the at least one maximum coding unit. The maximum coding unit according to an embodiment may be a data unit having a size of, for example, 32×32, 64×64, 128×128, 256×256, etc., wherein a shape of the data unit is a square having a width and a length that are each a multiple of 2 and greater than 8. The image data may be output to the coding unit determiner 120 according to the at least one maximum coding unit.

A coding unit according to an embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment is split according to depths, the image data of a spatial domain included in the maximum coding unit may be hierarchically classified according to depths.

A maximum depth and a maximum size of a coding unit, which limit the total number of times a height and a width of the maximum coding unit may be hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having a least encoding error. Thus, the encoded image data of the coding unit corresponding to the determined coded depth is finally output. Also, the coding units corresponding to the determined coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is decreased as a coding unit is hierarchically split according to depths, and the number of coding units increases accordingly. Also, when coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The term 'coding units having a tree structure' according to an embodiment refers to coding units corresponding to the determined coded depth, from among all deeper coding units included in the maximum coding unit. A coding unit of a coded depth may be hierarchically determined according to depths in the same region of the maximum coding unit, and may be independently determined in different regions. In other words, a coded depth in a current region may be independently determined from a coded depth in another region.

A maximum depth according to an embodiment is an index related to the number of splitting times from a maximum coding unit to a minimum coding unit. A first maximum depth according to an embodiment may denote a total number of splitting times from the maximum coding unit to the minimum coding unit. A second maximum depth according to an embodiment may denote a total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, when the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation may be also performed based on the deeper coding units according to a depth equal to or less than the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation may be performed on all of the deeper coding units generated as the depth deepens. For convenience of description, the prediction encoding and the transformation will now be described based on a coding unit of a current depth, in a maximum coding unit.

The video encoding apparatus 100 may variously select a size or a shape of a data unit for encoding the image data. To encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

To perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a base unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type may include, for example, symmetrical partitions that are obtained by symmetrically splitting a height or a width of the prediction unit, partitions obtained by asymmetrically splitting the height or the width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

To perform the transformation in the coding unit, the transformation may be performed based on a data unit having a size smaller than or equal to the coding unit. For example, the data unit for the transformation may include a data unit for an intra mode and a data unit for an inter mode.

A data unit used as a base unit of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, split into a total of $4^1$ transformation units, and the size of the transformation unit is thus N×N, and may be 2 when each of the height and width of the current coding unit is split into four equal parts, split into a total of $4^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to a coded depth may include information about the coded depth, the partition type in the prediction unit, the prediction mode, and the size of the transformation unit.

The information about the coded depth may be defined by using split information according to depths, which indicates whether encoding is to be performed on coding units of a lower depth instead of a current depth. When the current depth of the current coding unit is the coded depth, image data in the current coding unit is encoded and output, and thus the split information may be defined not to split the current coding unit to a lower depth. Alternatively, when the current depth of the current coding unit is not the coded depth, the encoding is performed on the coding unit of the lower depth, and thus the split information may be defined to split the current coding unit to obtain the coding units of the lower depth.

When the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one maximum coding unit, and information about at least one encoding mode is determined for a coding unit of a coded depth, the information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an embodiment may be a rectangular data unit obtained by splitting the minimum coding unit corresponding to the lowermost depth by 4, and may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include, for example, information about an estimated direction of an inter mode, information about a reference image index of the inter mode, information about a motion vector, information about a chroma component of an intra mode, and information about an interpolation method of the intra mode. Also, information about a maximum size of the coding unit defined according to pictures, slices, or groups of pictures (GOPs), and information about a maximum depth may be inserted into a header of a bitstream.

In the video encoding apparatus 100, the deeper coding unit may be a coding unit obtained by dividing a height and a width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, when an image having higher resolution or larger data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted by considering characteristics of an image and increasing a maximum size of a coding unit while considering a size of the image.

Figure 2:
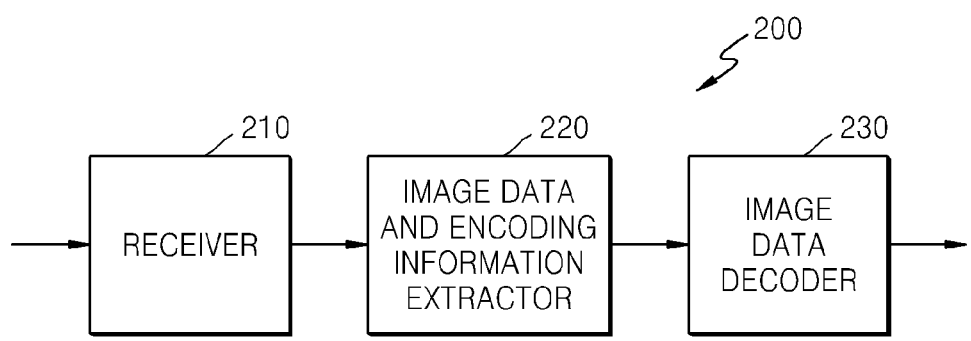
FIG. 2 is a block diagram of an apparatus for decoding a video, according to an embodiment.

FIG. 2 is a block diagram of a video decoding apparatus 200, according to an embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes for various operations of the video decoding apparatus 200 are substantially the same as those described with reference to FIG. 1 and thus, detailed descriptions thereof will be omitted.

The receiver 205 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or Sequence Parameter Set (SPS).

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and the information about the encoding mode may include information about a partition type of a corresponding coding unit corresponding to the coded depth, information about a prediction mode, and information about a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to a method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, to perform the inverse transformation according to maximum coding units.

The image data decoder 230 may determine at least one coded depth of a current maximum coding unit by using split information according to depths. When the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

That is, data units containing the encoding information including the same split information may be gathered by observing the encoding information assigned to the predetermined data unit from among the coding unit, the prediction unit, and the minimum unit, and the gathered data units may be considered to be a data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering a resolution and an amount of image data.

Accordingly, even when image data has a higher resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an embodiment, will now be described with reference to FIGS. 3 through 13.

Figure 3:
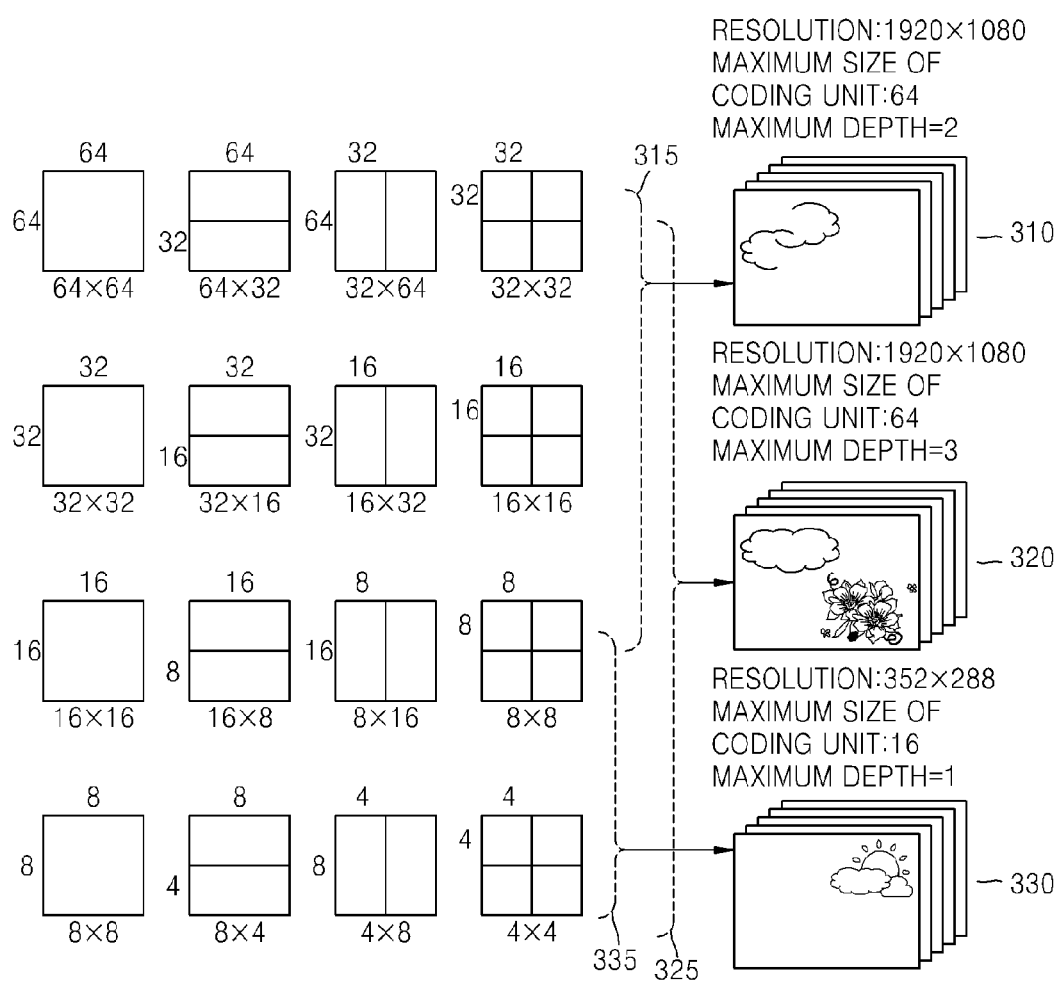
FIG. 3 is a diagram for describing a concept of coding units according to an embodiment.

FIG. 3 is a diagram for describing a concept of coding units according to an embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

When a resolution is higher or a data amount is larger, a maximum size of a coding unit may be larger to not only increase encoding efficiency but also accurately reflect characteristics of an image. Accordingly, the maximum size of the coding unit of the video data 310 and 320 having the higher resolution than that of the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
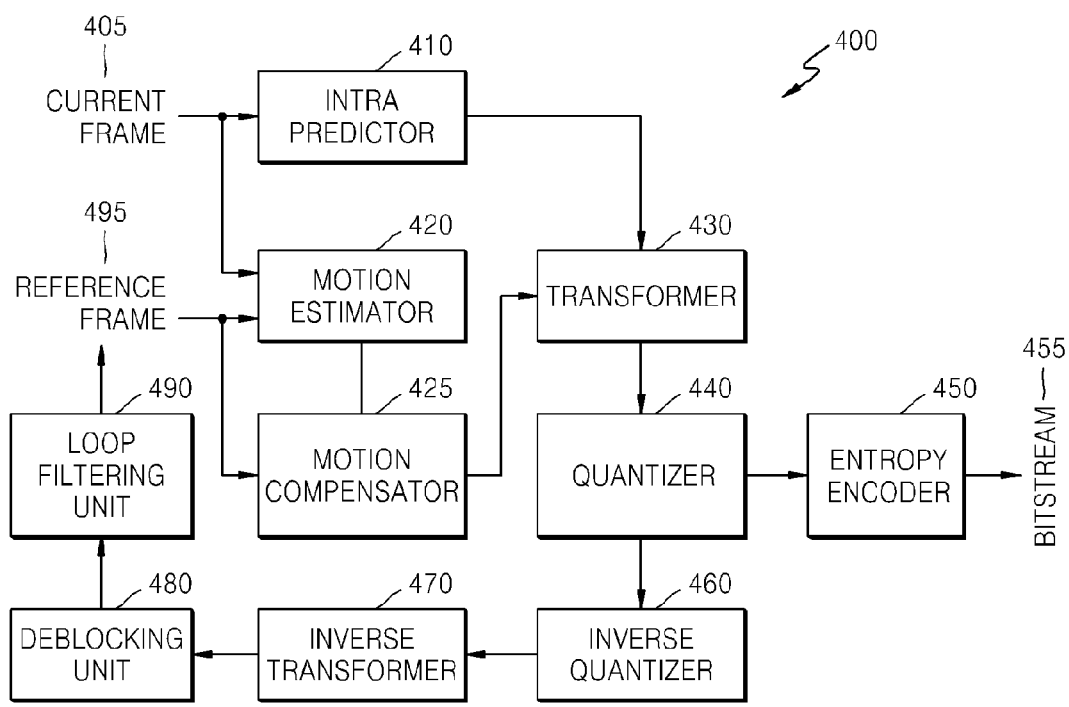
FIG. 4 is a block diagram of an image encoder based on coding units according to an embodiment.

FIG. 4 is a block diagram of an image encoder 400 based on coding units, according to an embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
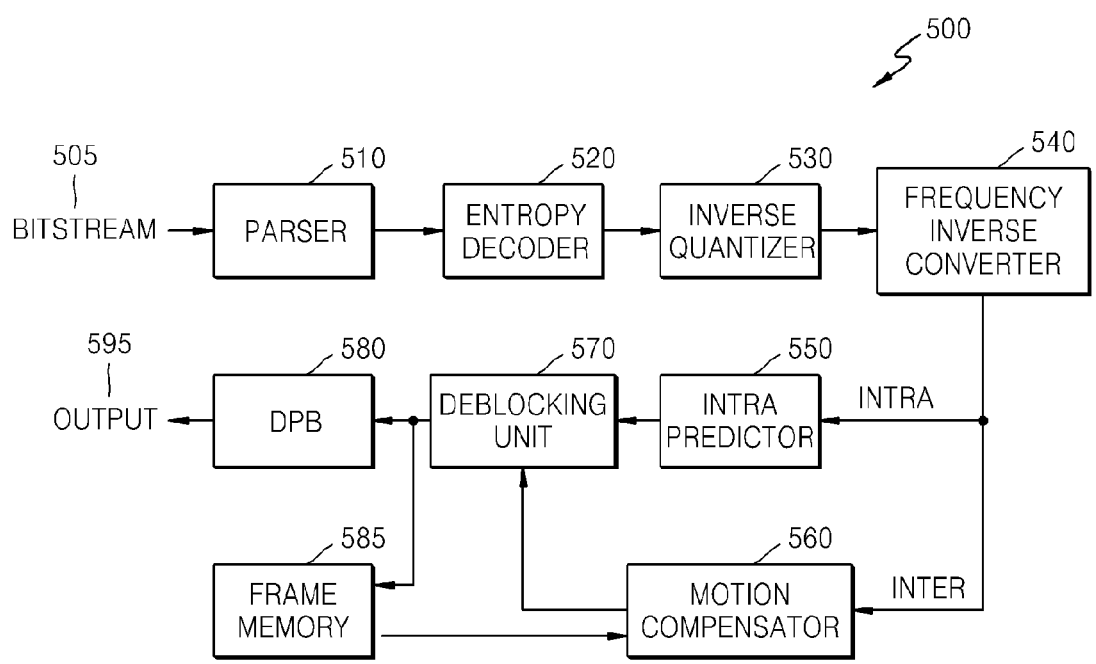
FIG. 5 is a block diagram of an image decoder based on coding units according to an embodiment.

FIG. 5 is a block diagram of an image decoder 500 based on coding units, according to an embodiment.

A parser 510 parses encoded image data to be decoded and information about encoding required for decoding from a bitstream 505. The encoded image data is output as inverse quantized data through the entropy decoder 520 and an inverse quantizer 530, and the inverse quantized data is restored to image data in a spatial domain through a frequency inverse converter 540.

An intra predictor 550 performs intra prediction on coding units in an intra mode with respect to the image data in the spatial domain, and a motion compensator 560 performs motion compensation on coding units in an inter mode by using a reference frame from a frame memory 585.

The data in the spatial domain which has passed through the intra predictor 550 and the motion compensator 560 may be post-processed through the deblocking unit 570 and a loop filtering unit 580 and then may be output as a restored frame 595. Also, the data that has been post-processed through the deblocking unit 570 may be output as the reference frame 585.

To decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., all of the parser 510, the entropy decoder 520, the inverse quantizer 530, the frequency inverse converter 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 determine partitions and a prediction mode for each of the coding units having a tree structure, and the frequency inverse converter 540 determines a size of a transformation unit for each coding unit.

Figure 6:
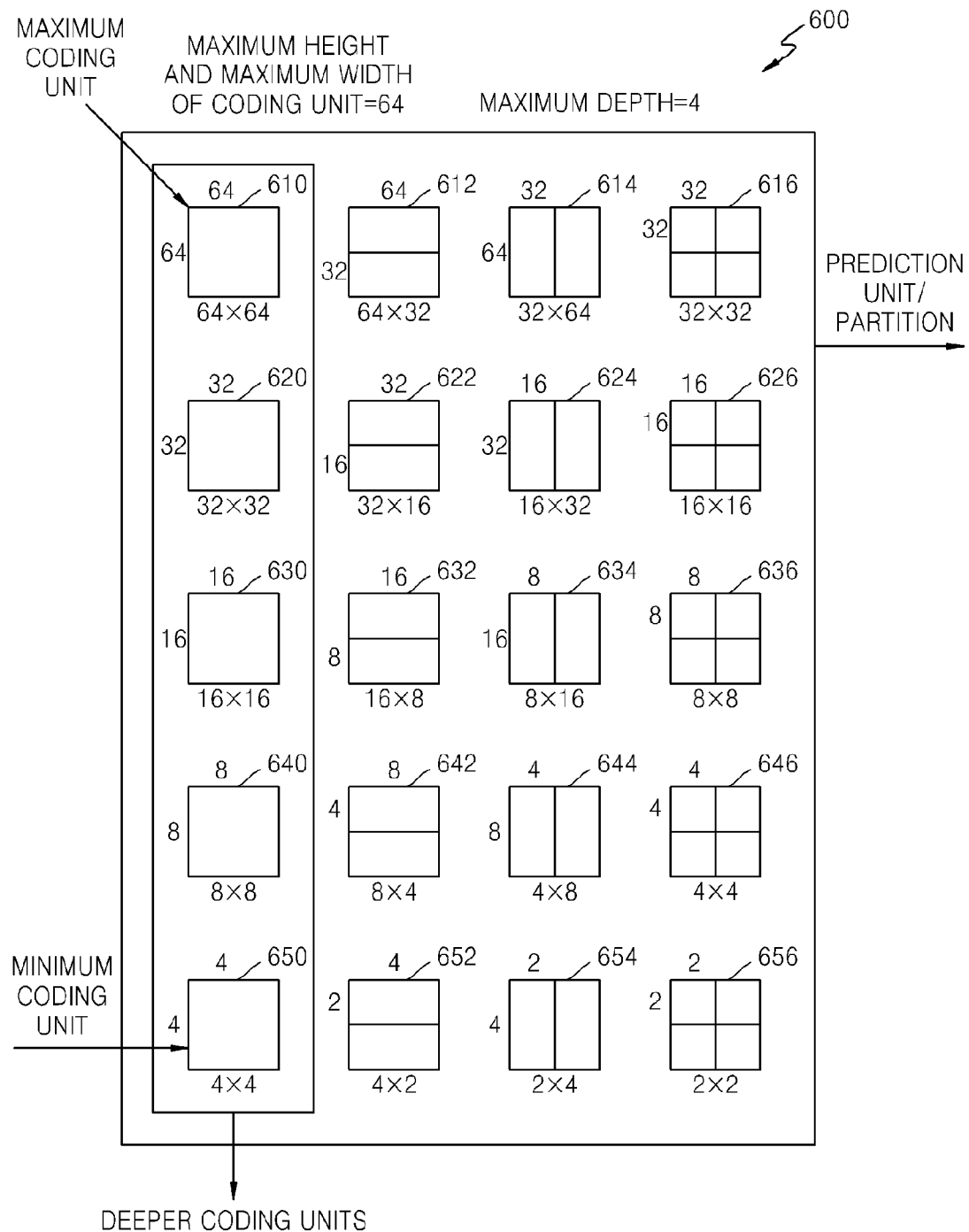
FIG. 6 is a diagram illustrating deeper coding units according to depths, and partitions according to an embodiment.

FIG. 6 is a diagram illustrating deeper coding units according to depths, and partitions, according to an embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by a width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, when the coding unit 610 having the size of 64×64 and the depth of 0 is a prediction unit, the prediction unit may be split into partitions included in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

To determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, to compare encoding results of the same data according to depths, the coding unit corresponding to the depth of 1 and four coding units corresponding to the depth of 2 are each encoded.

To perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, when a size of the coding unit 710 is 64×64, transformation may be performed by using the transformation units 720 having a size of 32×32.

Also, data of the coding unit 710 having the size of 64×64 may be encoded by performing transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a size of a transformation unit to be used when transformation is performed on a current coding unit. For example, the transformation unit may be a first intra transformation unit 822, a second intra transformation unit 824, a first inter transformation unit 826, or a second intra transformation unit 828.

Figure 9:
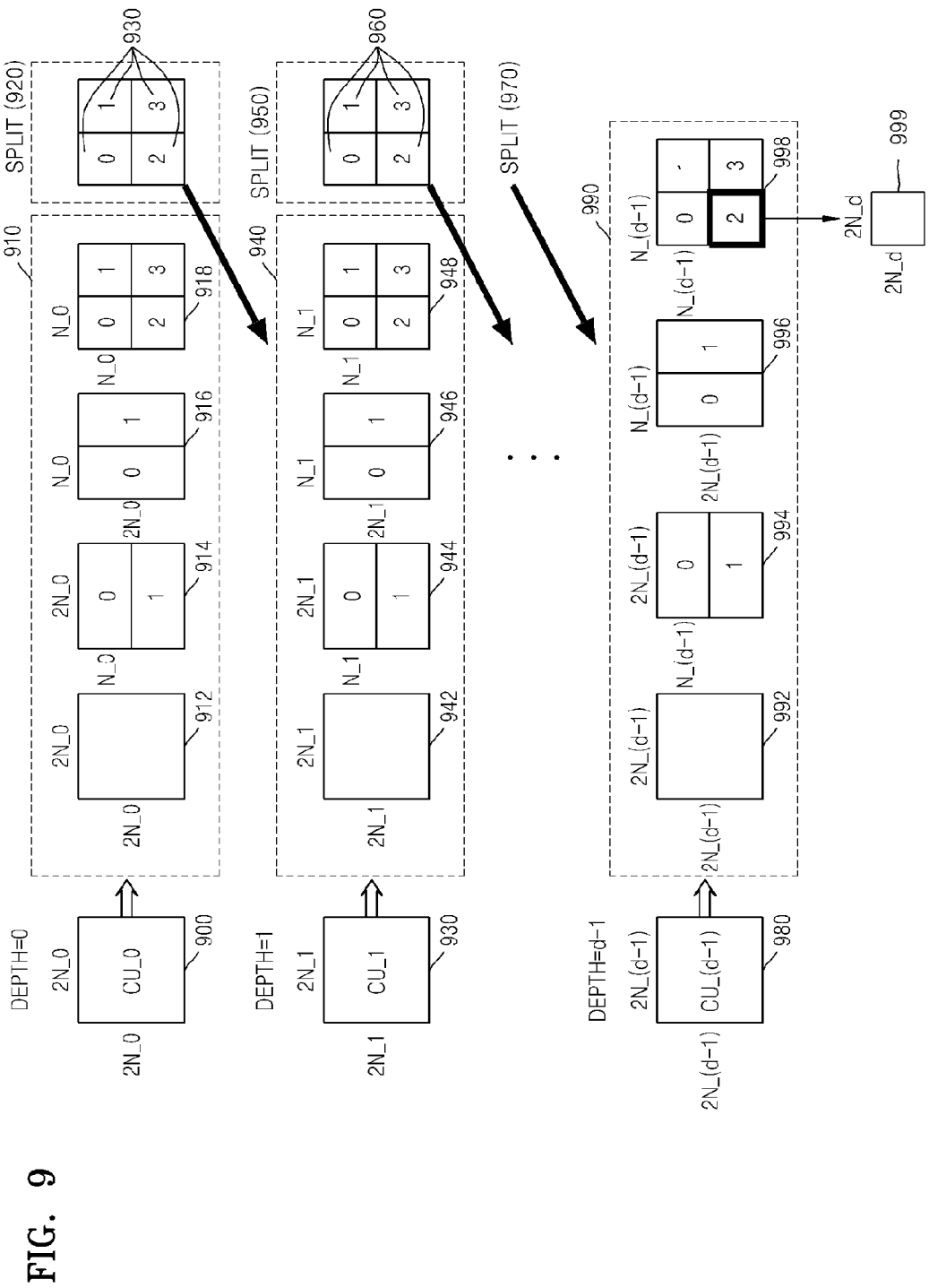
FIG. 9 is a diagram of deeper coding units according to depths, according to an embodiment.

The image data and encoding information extractor 220 of the video decoding apparatus 200 may extract and use the information 800, 810, and 820 for decoding, according to each deeper coding unit FIG. 9 is a diagram of deeper coding units according to depths, according to an embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

Errors of encoding including the prediction encoding in the partition types 912 through 918 are compared, and the least encoding error is determined among the partition types. When an encoding error is smallest in one of the partition types 912 through 916, the prediction unit 910 may not be split into a lower depth.

When the encoding error is the smallest in the partition type 918, a depth is changed from 0 to 1 to split the partition type 918 in operation 920, and encoding is repeatedly performed on coding units 930 having a depth of 1 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

When an encoding error is the smallest in the partition type 948, a depth is changed from 1 to 2 to split the partition type 948 in operation 950, and encoding is repeatedly performed on coding units 960, which have a depth of 2 and a size of N_1×N_1 to search for a minimum encoding error.

When a maximum depth is d, split operation according to each depth may be performed up to when a depth becomes (d−1), and split information may be encoded as up to when a depth is one of 0 to (d−2). In other words, when encoding is performed up to when the depth is (d−1) after a coding unit corresponding to a depth of (d−2) is split in operation 970, a prediction unit 990 for prediction encoding a coding unit 980 having a depth of (d−1) and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be (d−1) and a partition type of the current maximum coding unit 900 may be determined to be N_(d−1)×N_(d−1). Also, since the maximum depth is d and a minimum coding unit 980 having a lowermost depth of (d−1) is no longer split to a lower depth, split information for the minimum coding unit 980 is not set.

A data unit 999 may be a 'minimum unit' for the current maximum coding unit. A minimum unit according to an embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
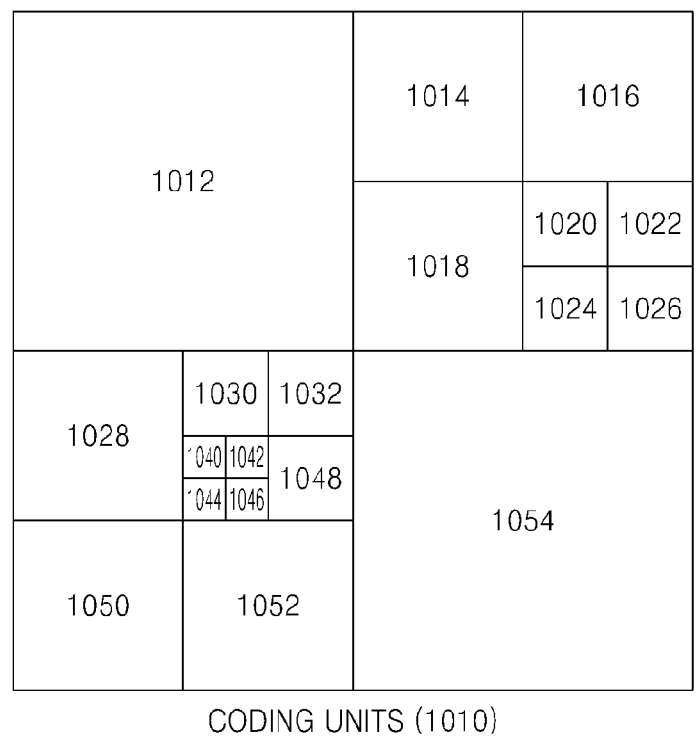
FIGS. 10 through 12 are diagrams for describing a relationship between coding units, prediction units, and transformation units, according to an embodiment.
Figure 11:
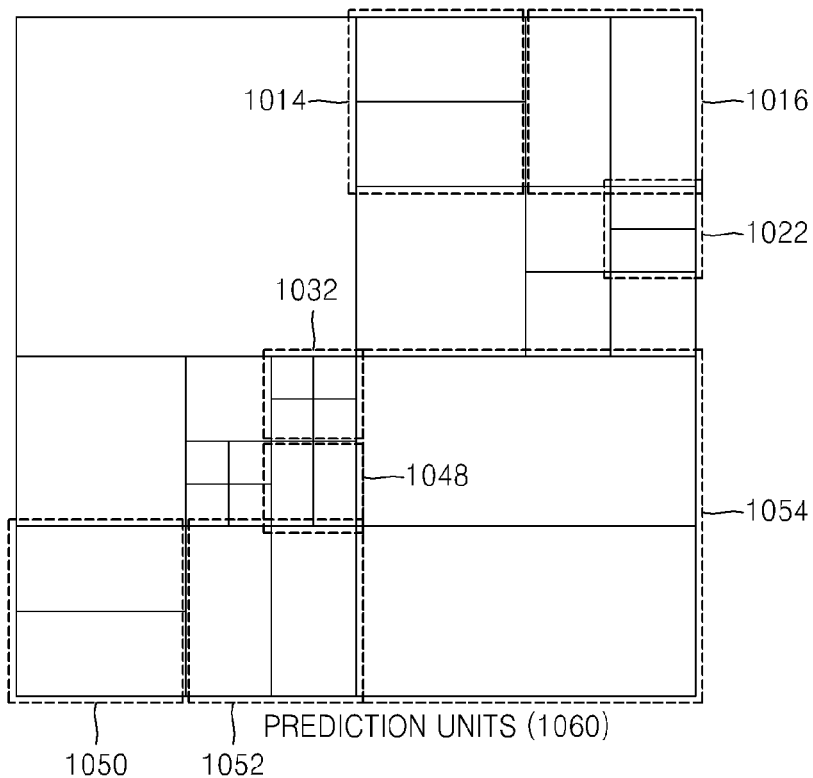
Figure 12:
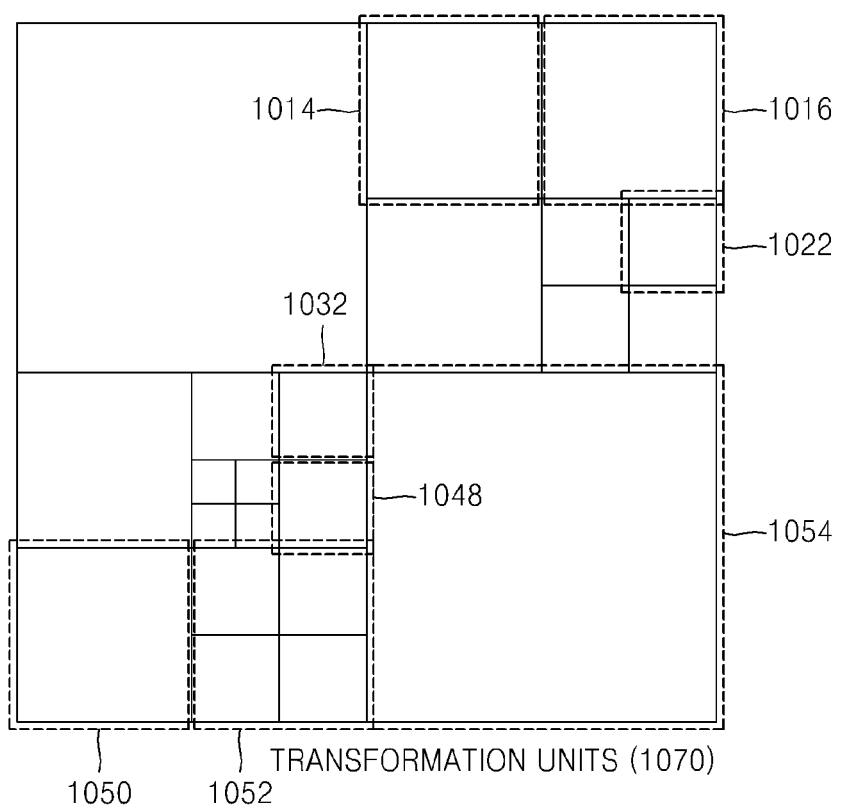

FIGS. 10 through 12 are diagrams for describing a relationship between coding units 1010, prediction units 1060, and transformation units 1070, according to an embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1054 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. When split information of a current depth d is 0, a depth, in which a current coding unit is no longer split into a lower depth, is a coded depth, and thus information about a partition type, a prediction mode, and a size of a transformation unit may be defined for the coded depth. When the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, when split information of the transformation unit is 0, the size of the transformation unit may be 2N×2N, which is the size of the current coding unit. When split information of the transformation unit is 1, the transformation units may be obtained by splitting the current coding unit. Also, when a partition type of the current coding unit having the size of 2N×2N is a symmetrical partition type, a size of a transformation unit may be N×N, and when the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a coding unit corresponding to a coded depth is determined by using encoding information of a data unit, and thus a distribution of coded depths in a maximum coding unit may be determined.

Accordingly, when a current coding unit is predicted based on encoding information of adjacent data units, encoding information of data units in deeper coding units adjacent to the current coding unit may be directly referred to and used.

Alternatively, when a current coding unit is predicted based on encoding information of adjacent data units, data units adjacent to the current coding unit are searched using encoded information of the data units, and the searched adjacent coding units may be referred for predicting the current coding unit.

Figure 13:
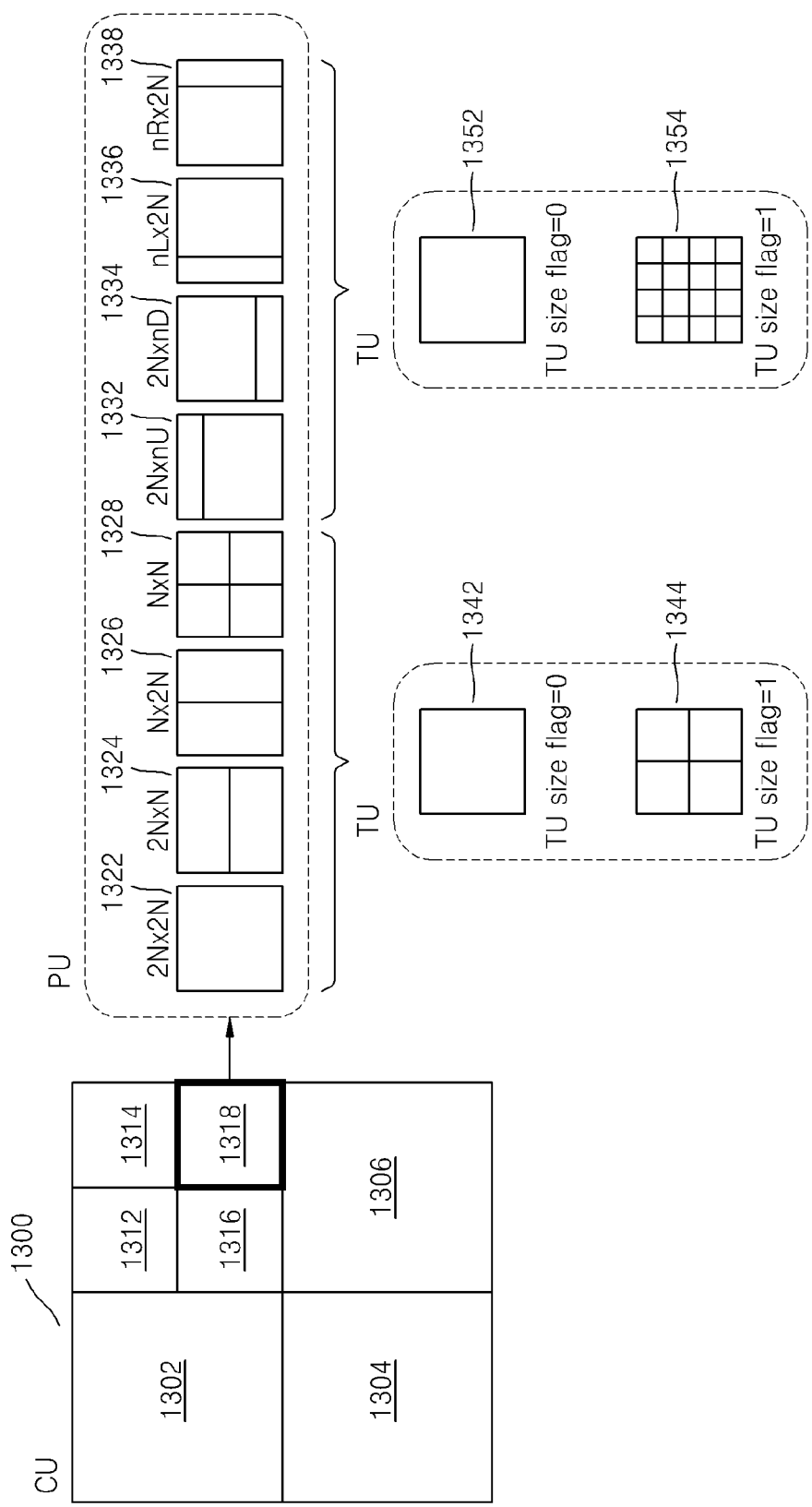
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 according to depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set when split information (i.e., TU size flag) of a transformation unit is 0, and a transformation unit 1344 having a size of N×N is set when the TU size flag is 1.

When the partition type is set to be asymmetrical, i.e., the partition type 1332, 1334, 1336, or 1338, a transformation unit 1352 having a size of 2N×2N is set when the TU size flag is 0, and a transformation unit 1354 having a size of N/2×N/2 is set when the TU size flag is 1.

Hereinafter, motion estimation and compensation processes that are performed by the motion estimator 420 and the motion compensator 425 of the image encoder 400 in FIG. 4 and the motion compensator 560 of the image decoder 500 in FIG. 5 will now be described in detail.

Figure 14:
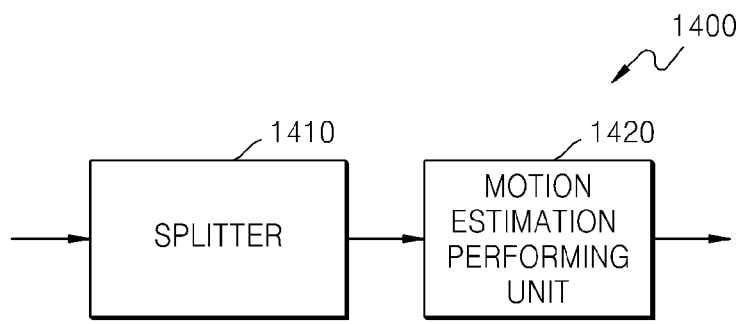
FIG. 14 is a block diagram illustrating a configuration of a motion estimating apparatus, according to an embodiment.

FIG. 14 is a block diagram illustrating a configuration of a motion estimating apparatus 1400, according to an embodiment. The motion estimating apparatus 1400 of FIG. 14 may correspond to the motion estimator 420 of FIG. 4.

Referring to FIG. 14, the motion estimating apparatus 1400 includes a splitter 1410 and a motion estimation performing unit 1420.

The splitter 1410 splits a picture, based on a maximum coding unit that is a coding unit having a maximum size. In the present embodiment, the maximum coding unit may have a size of $2^m \times 2^n$ (where m and n are integers). To provide the maximum coding unit having a size larger than a macroblock having a size of 16×16 according to the related art, each of m and n may have a value equal to or greater than 5. In the present embodiment, the maximum coding unit may be a data unit having a larger size such as 32×32, 64×64, 128×128, 256×256, etc. The splitter 1410 splits the maximum coding unit into prediction units having a hierarchical structure, according to a plurality of split modes indicating split forms of the maximum coding unit. As described above, the maximum coding unit may be split into deeper coding units according to depths, based on a depth indicating a total number of spatial splits of the maximum coding unit, and each of the deeper coding units according to depths may be split into prediction units (or partitions) for motion estimation or intra prediction.

The motion estimation performing unit 1420 performs the motion estimation on each of the prediction units included in the maximum coding unit and thus obtains a motion vector of each of the prediction units. In particular, the motion estimation performing unit 1420 according to the present embodiment does not perform the motion estimation on a prediction unit having a size greater than a predetermined size from among prediction units included in the maximum coding unit that is split according to a block mode, but performs the motion estimation only on a prediction unit having a size equal to or less than the predetermined size. The motion estimation performing unit 1420 obtains a motion vector of the prediction unit having the size greater than the predetermined size, by using a motion vector of the prediction unit having the size equal to or less than the predetermined size. A process of determining motion vectors according to sizes of predictions units will be described later below.

Figure 15:
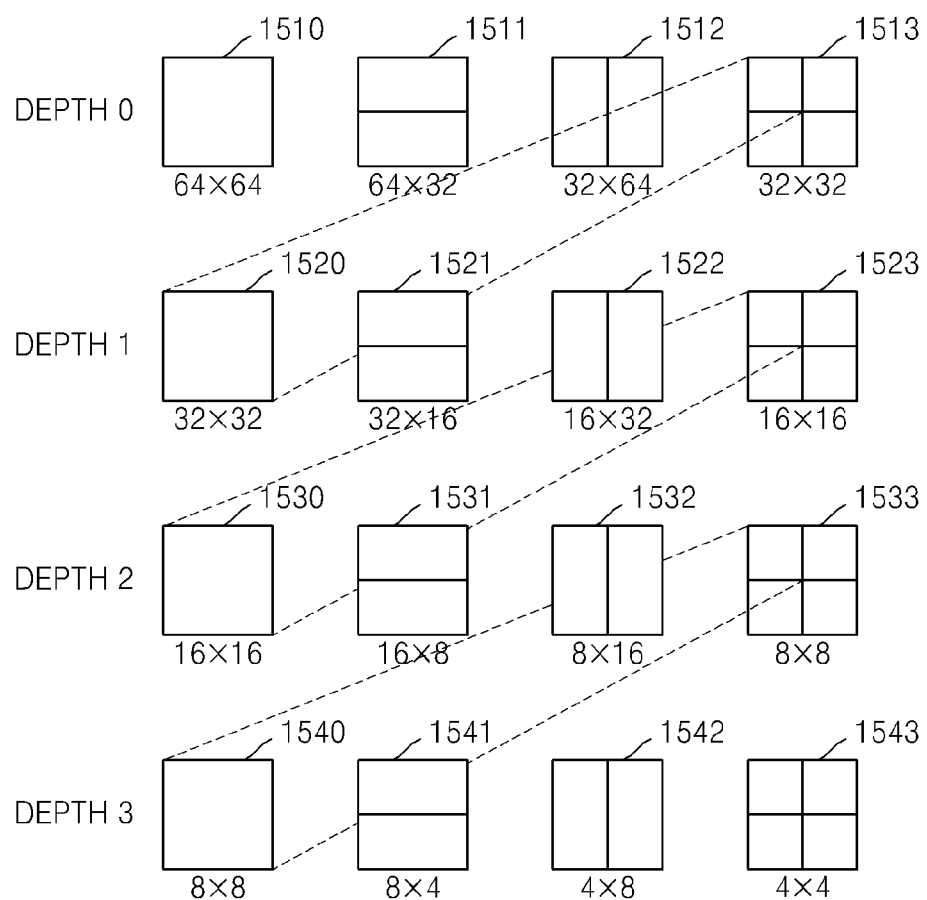
FIG. 15 illustrates deeper coding units according to depths and prediction units for motion estimation, according to an embodiment.

FIG. 15 illustrates deeper coding units according to depths and prediction units for motion estimation, according to an embodiment. FIG. 15 illustrates an example in which a size of a maximum coding unit is 64×64, and a maximum depth is 3. As described above, each of the coding units according to depths may be split into 4 coding units of a lower depth. Also, as illustrated in FIG. 15, each of the coding units according to depths may be horizontally or vertically split so that prediction units for the motion estimation may be determined.

A maximum coding unit 1510 having a size of 64×64 and a depth of 0 may be motion-estimated by using the prediction unit 1510 having the size of 64×64, prediction units 1511 having a size of 64×32, prediction units 1512 having a size of 32×64, and prediction units 1513 having a size of 32×32.

A coding unit 1520 having a size of 32×32 and a depth of 1 may be motion-estimated by using the prediction unit 1520 having the size of 32×32, prediction units 1521 having a size of 32×16, prediction units 1522 having a size of 16×32, and prediction units 1523 having a size of 16×16.

A coding unit 1530 having a size of 16×16 and a depth of 2 may be motion-estimated by using the prediction unit 1530 having the size of 16×16, prediction units 1531 having a size of 16×8, prediction units 1532 having a size of 8×16, and prediction units 1533 having a size of 8×8.

A coding unit 1540 having a size of 8×8 and a depth of 3 may be motion-estimated by using the prediction unit 1540 having the size of 8×8, prediction units 1541 having a size of 8×4, prediction units 1542 having a size of 4×8, and prediction units 1543 having a size of 4×4.

Hereinafter, an example is described, in which motion estimation with respect to a maximum coding unit is performed while a size of the maximum coding unit is 64×64, a maximum depth is 3, and each of deeper coding units according to depths uses prediction units the same as those shown in FIG. 15. However, one or more embodiments are not limited thereto, and a method of determining a motion vector according to embodiments may be applied to examples in which the maximum coding unit, the maximum depth, or prediction units are different from those shown in FIG. 15 are used.

Figure 16:
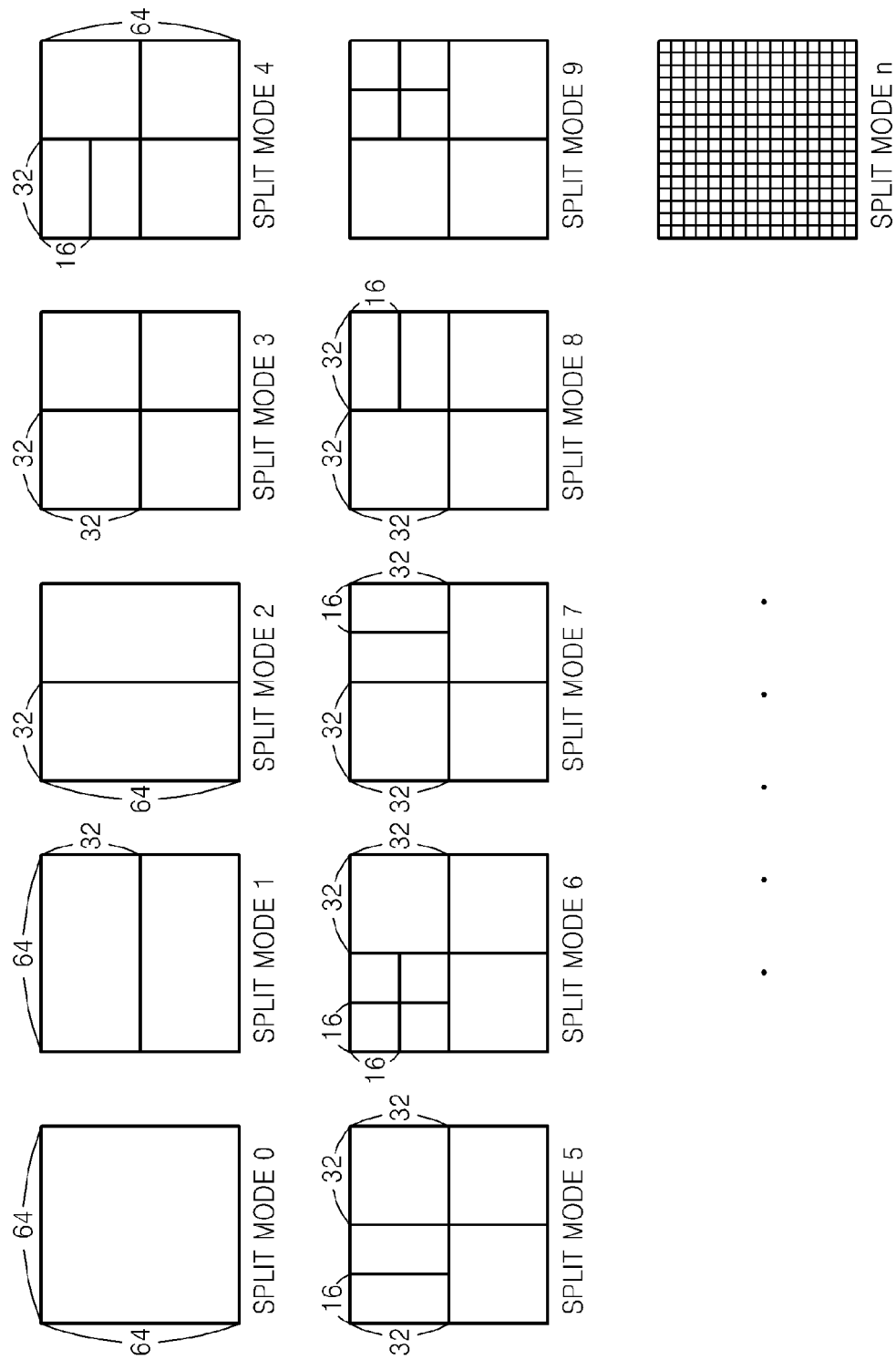
FIG. 16 illustrates split modes of a maximum coding unit, according to an embodiment.

FIG. 16 illustrates split modes of a maximum coding unit, according to an embodiment.

As illustrated in FIG. 16, the maximum coding unit may have lots of split forms, according to a size and a maximum depth of the maximum coding unit, and a form of a prediction unit for predicting each coding unit according to depths. Each of the split modes indicates a split form of the maximum coding unit to be predicted. For example, a split mode 0 indicates a mode in which the maximum coding unit having a size of 64×64 is used as a prediction unit without a split, i.e., motion estimation is performed on the prediction unit having the size of 64×64. A split mode 1 indicates a mode in which motion estimation is performed by using two prediction units having a size of 64×32 obtained by horizontally bisecting the maximum coding unit. A split mode n (where n is an integer) indicates a mode in which the maximum coding unit is split into useable minimum prediction units, e.g., the maximum coding unit is split into 256 prediction units having a size of 4×4. However, whether a split mode with a particular number indicates a particular split form of the maximum coding unit is not limited to the split forms shown in FIG. 16 and may vary.

To perform motion estimation coding, motion estimation needs to be performed on each of prediction units included in the maximum coding unit according to the split modes, and thus a motion vector has to be determined with respect to each of the prediction units. However, as illustrated in FIG. 16, when the motion estimation is performed based on coding units having a hierarchical structure according to the present embodiment, a maximum coding unit having a larger size is used, such that a total number of split modes of the maximum coding unit is increased and thus computation during the motion estimation is also increased.

Thus, the motion estimation performing unit 1420 may perform motion estimation only on prediction units having a size equal to or less than a predetermined size from among prediction units having various sizes which are included in the maximum coding unit, and thus obtain motion vectors of the prediction units having the size equal to or less than the predetermined size. The motion estimation performing unit 1420 may not separately perform motion estimation on a prediction unit having a size greater than the predetermined size, and may determine a motion vector, which is obtained by performing motion estimation on a prediction unit of a lower level with a size equal to or less than the predetermined size, as a motion vector of the prediction unit having the size greater than the predetermined size. A size of a prediction unit for determining whether or not to perform motion estimation may be variously set. For example, the motion estimation performing unit 1420 sets a reference size of 16×16, does not perform motion estimation on a prediction unit of which any one of vertical and horizontal lengths is greater than 16, and performs the motion estimation only on a prediction unit having a size equal to or less than 16×16. Then, the motion estimation performing unit 1420 may determine a motion vector, which is obtained by performing motion estimation on a prediction unit having a size of 16×16, as a motion vector of prediction units having a size greater than 16×16.

For the motion vector of the prediction unit having the size greater than the predetermined size, a motion vector of a prediction unit having the predetermined size at a predetermined location from among prediction units that are obtained by splitting the prediction unit having the size greater than the predetermined size may be used. For example, a motion vector of a prediction unit having a size of 16×16 that is located in an upper left corner of a prediction unit having a size of 32×32 may be used as the motion vector of the prediction unit having the size of 32×32. A location of the prediction unit having the motion vector and the size greater than the predetermined size is not limited to the aforementioned description but may be changed.

Also, for the motion vector of the prediction unit having the size greater than the predetermined size, one of an average value and an intermediate value of motion vectors of prediction units that have the predetermined size, exist in predetermined locations of the prediction unit having the size greater than the predetermined size, and are obtained by splitting the prediction unit having the size greater than the predetermined size may be used. For example, in a case where a maximum coding unit having a size of 64×64 is split into prediction units having a size of 16×16 according to a split mode, an average value or an intermediate value of motion vectors of the prediction units having the size of 16×16 and existing in predetermined locations may be used as a motion vector of the maximum coding unit having the size of 64×64.

Also, for the motion vector of the prediction unit having the size greater than the predetermined size, a motion vector of a prediction unit having the predetermined size and included in another prediction unit that is different from the prediction unit having the size greater than the predetermined size and is from among the prediction units included in the maximum coding unit may be used. For example, in a case where a maximum coding unit having a size of 64×64 is split into two prediction units having a size of 64×32 according to a split mode 1, a motion vector of a prediction unit that has a size of 16×16 and exists in one prediction unit having the size of 64×32 may be used as a motion vector of the other one prediction unit having the size of 64×32.

Hereinafter, with reference to FIGS. 17 through 22, a method of determining a motion vector of a prediction unit having a size greater than a predetermined size, by using a motion vector of a prediction unit having the predetermined size, will now be described in detail. Here, it is assumed that 16×16 is a reference size, and a motion vector of a prediction unit having a size greater than 16×16 is to be determined.

Figure 17:
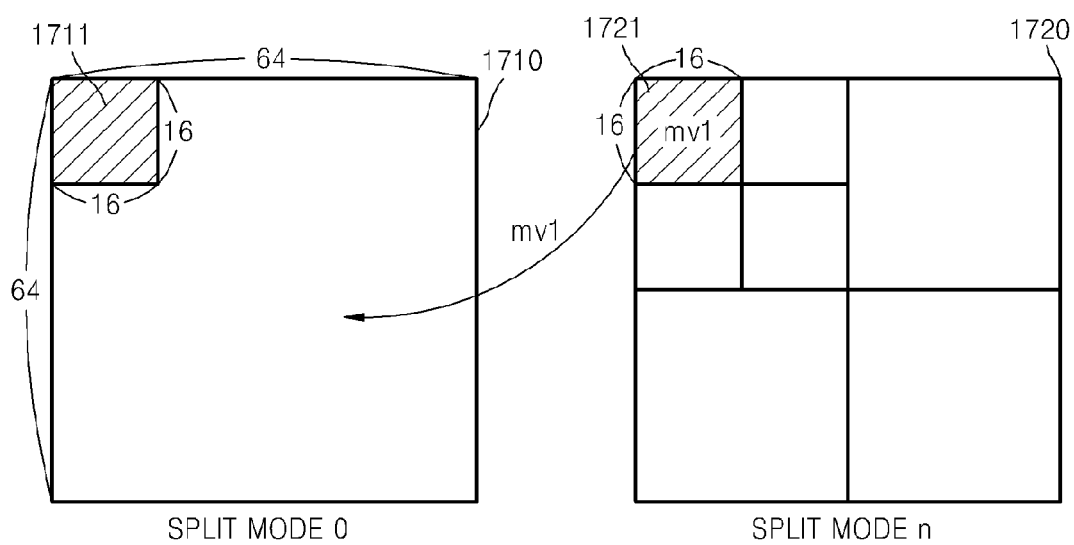
FIG. 17 illustrates an example of a process of determining a motion vector of a prediction unit having a size greater than a predetermined size, according to an embodiment.

FIG. 17 illustrates an example of a process of determining a motion vector of a prediction unit having a size greater than a predetermined size, according to an embodiment.

The motion estimation performing unit 1420 of the motion estimating apparatus 1400 as shown in FIG. 14 does not perform motion estimation on a prediction unit 1710 having a size of 64×64 and may determine a motion vector of a prediction unit 1711 having a size of 16×16 and existing in an upper left corner of the prediction unit 1710 having the size of 64×64, as a motion vector of the prediction unit 1710. That is, the motion estimation performing unit 1420 may determine a motion vector mv1 of a prediction unit 1721 having a size of 16×16, which is included in a maximum coding unit that is split from the prediction unit 1710 according to a predetermined split mode n, as the motion vector of the prediction unit 1710. Here, the motion vector mv1 of the prediction unit 1721 corresponds to the prediction unit 1711 having the size of 16×16 and existing in the upper left corner. Similarly, the motion estimation performing unit 1420 may determine motion vectors of prediction units having a size of 16×16 and existing in upper left corners of prediction units having sizes of 64×32, 32×64, 32×32, 32×16, and 16×32, respectively, as motion vectors of the prediction units having the sizes of 64×32, 32×64, 32×32, 32×16, and 16×32, respectively. As described above, a size of a prediction unit for determining whether or not to perform motion estimation is not limited to 16×16 and may vary. Also, a location of a prediction unit having a predetermined size which is used as a motion vector of a prediction unit having a size greater than the predetermined size may be changed depending on embodiments.

Figure 19:
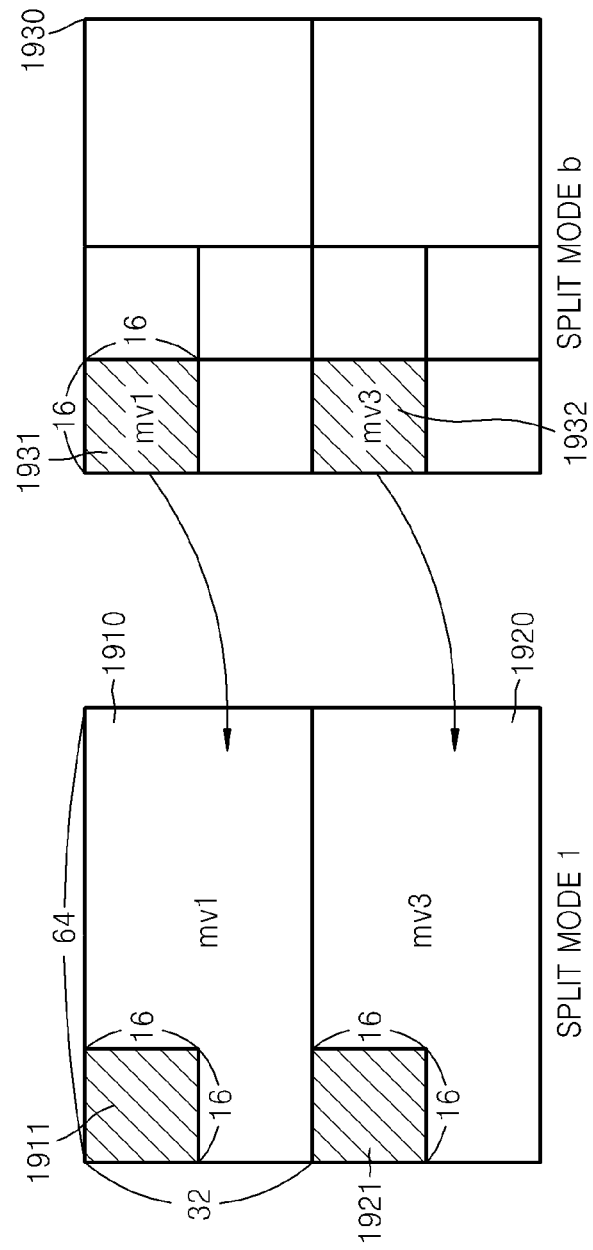
FIG. 19 illustrates an example of a process of determining a motion vector of a prediction unit having a size greater than a predetermined size, according to still another embodiment.

FIG. 19 illustrates an example of a process of determining a motion vector of a prediction unit having a size greater than a predetermined size, according to another embodiment.

The motion estimation performing unit 1420 does not perform motion estimation on two prediction units 1910 and 1920 that have a size of 64×32 that is split according to a split mode 1 and may determine motion vectors of prediction units 1911 and 1921 having a size of 16×16 and existing in upper left corners, as motion vectors of the prediction units 1910 and 1920 having the size of 64×32, respectively. That is, the motion estimation performing unit 1420 may determine a motion vector mv1 of a prediction unit 1931 having a size of 16×16 which is included in a maximum coding unit 1930 split according to a split mode b, as the motion vector of the prediction unit 1910 having the size of 64×32. Here, the prediction unit 1931 corresponds to the prediction unit 1911 having the size of 16×16 and existing in the upper left corner of the prediction unit 1910 having the size of 64×32. Similarly, the motion estimation performing unit 1420 may determine a motion vector mv3 of a prediction unit 1932 having a size of 16×16 which is included in the maximum coding unit 1930 split according to the split mode b, as the motion vector of the prediction unit 1920 having the size of 64×32. Here, the prediction unit 1932 corresponds to the prediction unit 1921 having the size of 16×16 and existing in the upper left corner of the prediction unit 1920 having the size of 64×32.

Figure 18:
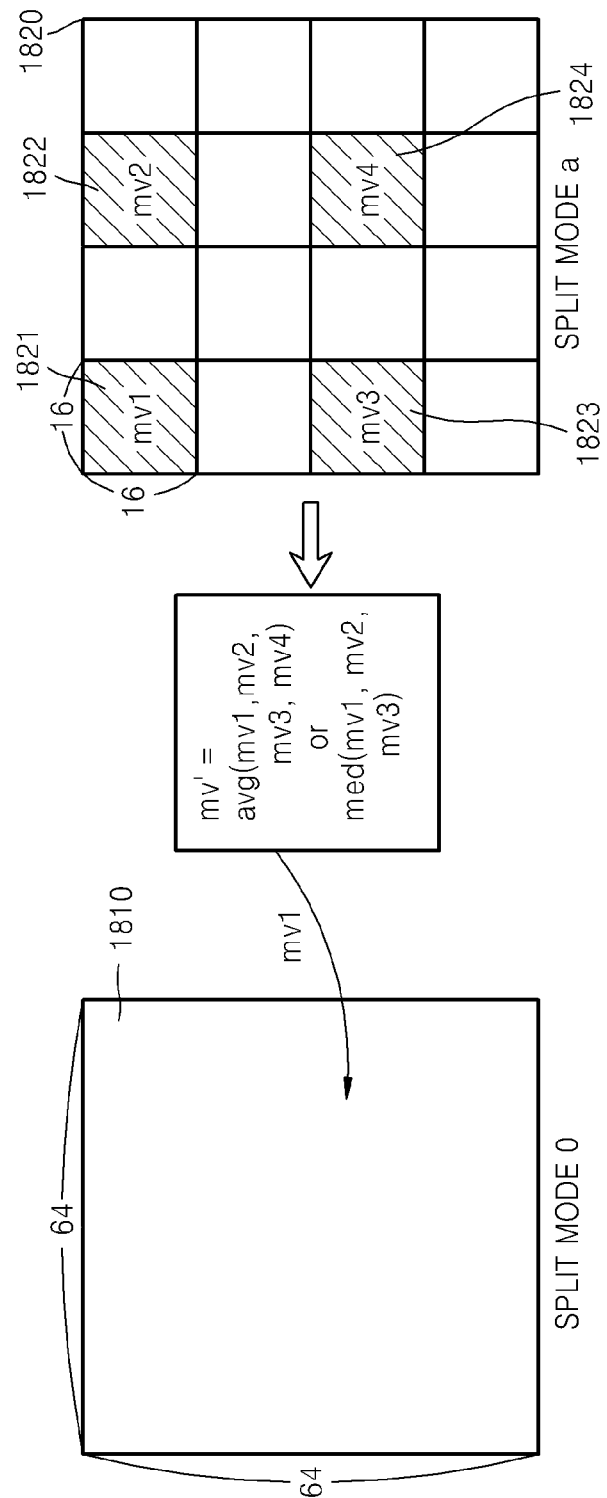
FIG. 18 illustrates an example of a process of determining a motion vector of a prediction unit having a size greater than a predetermined size, according to another embodiment.

FIG. 18 illustrates an example of a process of determining a motion vector of a prediction unit having a size greater than a predetermined size, according to still another embodiment.

The motion estimation performing unit 1420 does not perform motion estimation on a prediction unit 1810 having a size of 64×64, and may determine an average value or an intermediate value of motion vectors of prediction units that have a size of 16×16, exist in predetermined locations, and are from among prediction units obtained by splitting the prediction unit 1810, as a motion vector of the prediction unit 1810. Referring to FIG. 18, when the motion estimation is performed in a manner such that a maximum coding unit 1820 is split into the prediction units having the size of 16×16 according to a split mode a, an average value avg (mv1, mv2, mv3, mv4) of motion vectors mv1, mv2, mv3, and mv4 of prediction units 1821, 1822, 1823, and 1824 having a size of 16×16 and existing in predetermined locations may be determined as the motion vector of the prediction unit 1810 having the size of 64×64. Locations and a total number of prediction units having the size of 16×16 which are used in determining the average value or an intermediate value may be changed depending on embodiments.

Figure 20:
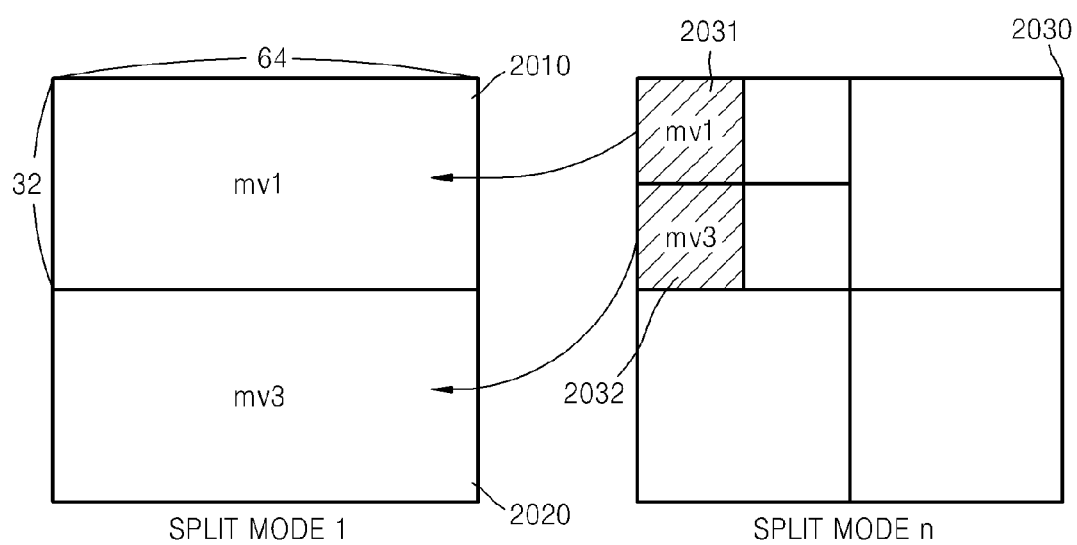
FIG. 20 illustrates an example of a process of determining a motion vector of a prediction unit having a size greater than a predetermined size, according to still another embodiment.

FIG. 20 illustrates an example of a process of determining a motion vector of a prediction unit having a size greater than a predetermined size, according to still another embodiment.

The motion estimation performing unit 1420 may determine, as a motion vector of the prediction unit having the size greater than the predetermined size, a motion vector of a prediction unit having the predetermined size and included in another prediction unit that is different from the prediction unit having the size greater than the predetermined size and is from among prediction units included in a maximum coding unit. In more detail, to determine a motion vector of a prediction unit 2010 having a size of 64×32 and being from among two prediction units 2010 and 2020 that have the size of 64×32 and are split according to a split mode 1, the motion estimation performing unit 1420 may determine a motion vector mv1 of a prediction unit 2031 having a size of 16×16, as the motion vector of the prediction unit 2010 having the size of 64×32, and here, the prediction unit 2031 corresponds to a location of an uppermost left corner of the prediction unit 2010 that has the size of 64×32 and is from among prediction units included in a maximum coding unit 2030 split according to a predetermined split mode n. To determine a motion vector of a prediction unit 2020 having the size of 64×32, the motion estimation performing unit 1420 may determine a motion vector mv3 of a prediction unit 2032 having the size of 16×16, as the motion vector of the prediction unit 2020 having the size of 64×32, wherein the prediction unit 2032 is located below the uppermost left corner of the prediction unit 2010 having the size of 64×32 and being from among the prediction units that are included in the maximum coding unit 2030 split according to the predetermined split mode n. In this manner, based on a split form of the prediction unit having the a greater than the predetermined size, the motion estimation performing unit 1420 may determine the motion vector of the prediction unit having the size greater than the predetermined size, by using only motion vectors of prediction units having a size of 16×16 and located in the upper left corner of the maximum coding unit 2030.

Figure 21:
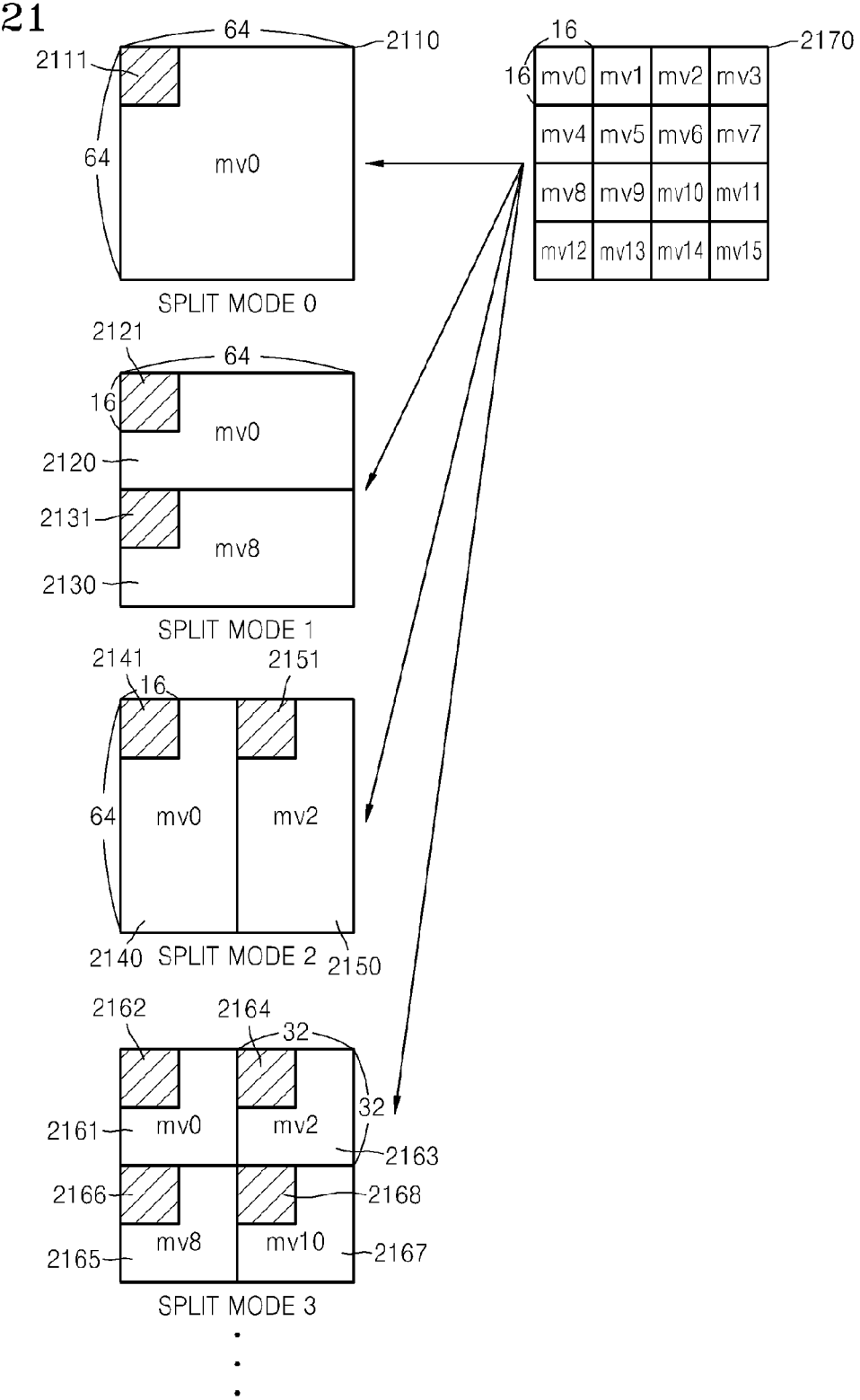
FIG. 21 illustrates a process of determining a motion vector of a prediction unit having a size greater than a predetermined size, according to a still another embodiment.

FIG. 21 illustrates a process of determining a motion vector of a prediction unit having a size greater than a predetermined size, according to still another embodiment.

As described with reference to FIGS. 17 and 19, the motion estimation performing unit 1420 does not perform motion estimation on a prediction unit having a size greater than a predetermined size but may determine a motion vector of the prediction unit having the size greater than the predetermined size, by using a prediction unit that has the predetermined size, exists in a predetermined location of the prediction unit having the size greater than the predetermined size, and is included in a maximum coding unit split according to a predetermined split mode. Referring to FIG. 21, the motion estimation performing unit 1420 may determine a motion vector of a prediction unit having a size of 16×16 from among motion vectors of prediction units 2170 having the size of 16×16 obtained by splitting a maximum coding unit according to a predetermined split mode, as a motion vector of a prediction unit having a size greater than a predetermined size, and the prediction unit having the size of 16×16 corresponds to a predetermined location of the prediction unit having the size greater than the predetermined size.

For example, a motion vector mv0 of a prediction unit 2111 having the size of 16×16 and existing in an upper left corner of a prediction unit 2110 having a size of 64×64 may be determined as a motion vector of the prediction unit 2110 having the size of 64×64. A motion vector mv0 of a prediction unit 2121 having the size of 16×16 and existing in an upper left corner of a prediction unit 2120 having a size of 64×32 may be determined as a motion vector of the prediction unit 2120 having the size of 64×32. A motion vector mv8 of a prediction unit 2131 having the size of 16×16 and existing in an upper left corner of a prediction unit 2130 having a size of 64×32 may be determined as a motion vector of the prediction unit 2130 having the size of 64×32. A motion vector mv0 of a prediction unit 2141 having the size of 16×16 and existing in an upper left corner of a prediction unit 2140 having a size of 32×64 may be determined as a motion vector of the prediction unit 2140 having the size of 32×64. A motion vector mv2 of a prediction unit 2151 having the size of 16×16 and existing in an upper left corner of a prediction unit 2150 having a size of 32×64 may be determined as a motion vector of the prediction unit 2150 having the size of 32×64. Similarly, motion vectors mv0, mv2, mv8, and mv10 of prediction units 2162, 2164, 2166, and 2168 having a size of 16×16 and existing in upper left corners of prediction units 2161, 2163, 2165, and 2167 having a size of 32×32, respectively, may be determined as motion vectors of the prediction units 2161, 2163, 2165, and 2167 having the size of 32×32, respectively.

Figure 22:
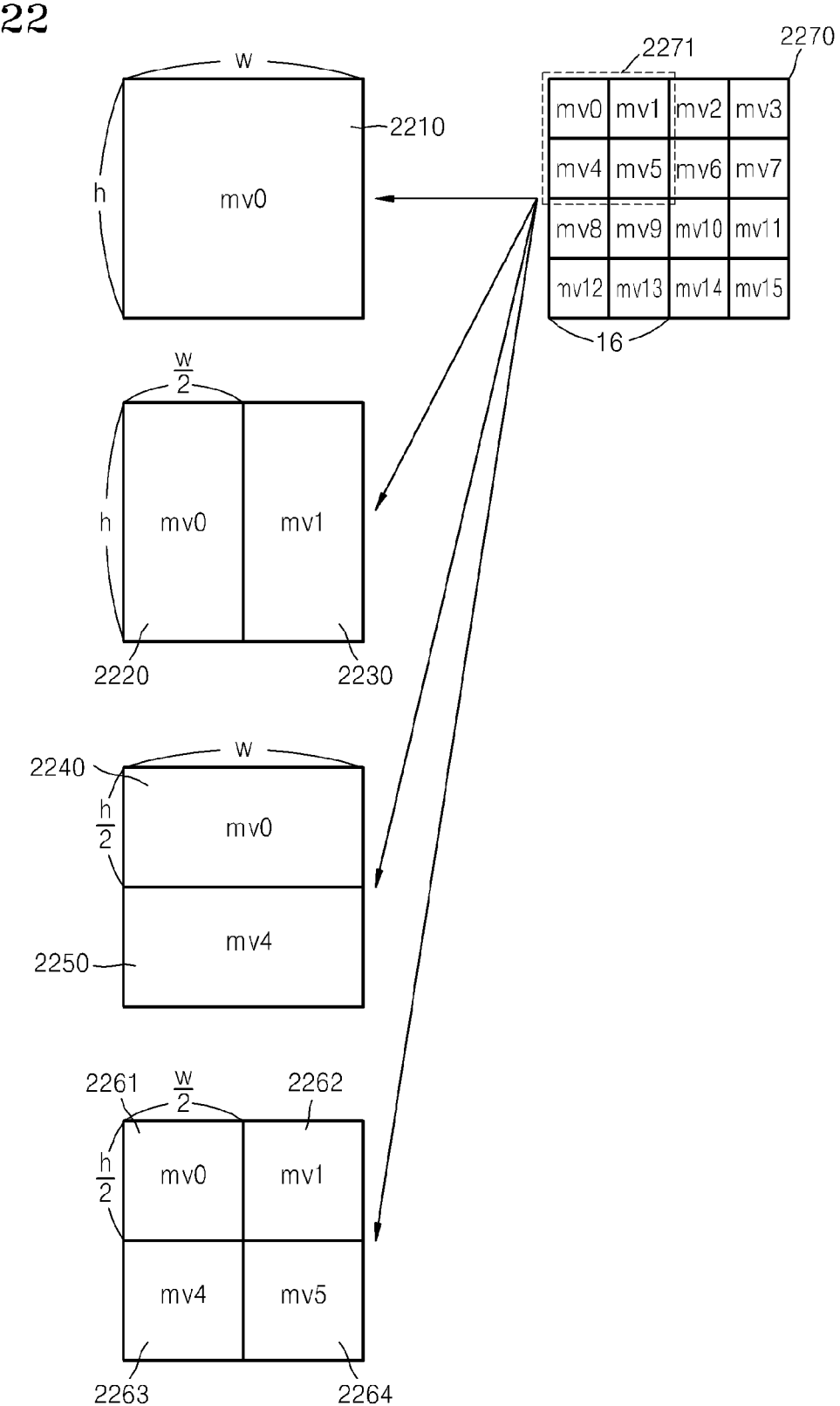
FIG. 22 illustrates a process of determining a motion vector of a prediction unit having a size greater than a predetermined size, according to still another embodiment.

FIG. 22 illustrates a process of determining a motion vector of a prediction unit having a size greater than a predetermined size, according to still another embodiment.

The motion estimation performing unit 1420 may determine a motion vector of a prediction unit having a size greater than a predetermined size, by using only motion vectors of prediction units having a size of 16×16 and located in an upper left corner of a maximum coding unit, based on a split form of the prediction unit having the size greater than the predetermined size. Referring to FIG. 22, the motion estimation performing unit 1420 may determine a motion vector of a prediction unit having a size greater than 16×16, by using only motion vectors of prediction units 2271 having the size of 16×16 and located in an upper left corner from among motion vectors of prediction units 2270 that have the size of 16×16 and are obtained by splitting a maximum coding unit according to a predetermined split mode. For example, for a motion vector of a prediction unit 2210 having a size of w×h (where, w and h are integers equal to or greater than 32), a motion vector mv0 of a prediction unit located uppermost left from among prediction units 2271 having a size of 16×16 and located in an upper left corner may be determined.

For prediction units having a size greater than a predetermined size which are obtained by vertically splitting a coding unit of a predetermined depth, the motion estimation performing unit 1420 may determine mv0 or mv1 as a motion vector of the prediction unit having the size greater than the predetermined size, according to locations of the prediction units having the size greater than the predetermined size. For example, a motion vector of a prediction unit 2220 having a size of (w/2)×h and located left from among prediction units obtained by vertically splitting the prediction unit 2210 having the size of w×h may be determined as the motion vector mv0 of the prediction unit located uppermost left from among the prediction units 2271 having the size of 16×16 and located in the upper left corner of the prediction units 2270, and a motion vector of a prediction unit 2230 having a size of (w/2)×h and located right from among the prediction units obtained by vertically splitting the prediction unit 2210 having the size of w×h may be determined as the motion vector mv1 of a prediction unit located uppermost right from among the prediction units 2271 having the size of 16×16 and located in the upper left corner of the prediction units 2270.

For prediction units having a size greater than a predetermined size which are obtained by horizontally splitting the coding unit of the predetermined depth, the motion estimation performing unit 1420 may determine mv0 or mv4 as a motion vector of the prediction unit having the size greater than the predetermined size, according to locations of the prediction units having the size greater than the predetermined size. For example, a motion vector of a prediction unit 2240 having a size of w×(h/2) and located upper from among prediction units obtained by horizontally splitting the prediction unit 2210 having the size of w×h may be determined as the motion vector mv0 of the prediction unit located uppermost left from among the prediction units 2271 having the size of 16×16 and located in the upper left corner of the prediction units 2270, and a motion vector of a prediction unit 2250 having a size of w×(h/2) and located lower may be determined as the motion vector mv4 of a prediction unit located lowermost left from among the prediction units 2271 having the size of 16×16 and located in the upper left corner of the prediction units 2270.

For prediction units having a size greater than a predetermined size which are obtained by quadrisecting a coding unit of a predetermined depth, the motion estimation performing unit 1420 may determine one of mv0, mv1, mv4, and mv5 as a motion vector of the prediction unit having the size greater than the predetermined size, according to locations of the prediction units having the size greater than the predetermined size. For example, from among prediction units obtained by quadrisecting a coding unit having a size of w×h, a motion vector of a prediction unit 2261 having a size of (w/2)×(h/2) and located uppermost left may be determined as mv0, a motion vector of a prediction unit 2262 having the size of (w/2)×(h/2) and located uppermost right may be determined as mv1, a motion vector of a prediction unit 2263 having the size of (w/2)×(h/2) and located lowermost left may be determined as mv4, and a motion vector of a prediction unit 2264 having the size of (w/2)×(h/2) and located lowermost right may be determined as mv5.

In this manner, according to exemplary embodiments, motion vectors of prediction units included in a maximum coding unit according to split modes may be determined. A prediction error value during an inter prediction operation using a motion vector may be compared with a prediction error value of each prediction unit based on a different prediction mode such as an intra prediction mode, and thus a prediction mode of each prediction unit may be determined. Also, prediction error values of prediction units included in each coding unit according to depths may be compared to each other, and thus a split form of a maximum coding unit may be determined.

According to one or more embodiments, flag information may be added to a bitstream, the flag information indicating whether a motion vector of a prediction unit having a size equal to or less than a predetermined size is used as a motion vector of a prediction unit that has a size greater than the predetermined size and is from among prediction units included in a maximum coding unit. Also, size information about a prediction unit having a limit in motion estimation may be added to the bitstream. For example, when a flag that indicates whether the motion vector of the prediction unit having the size equal to or less than the predetermined size is used may corresponds to limit_motion_estimation_flag. When the flag limit_motion_estimation_flag is 1, this may mean that the motion estimation for the prediction unit having the size greater than the predetermined size is limited, and when the flag limit_motion_estimation_flag is 0, this may mean that the motion estimation is performed on the prediction unit having the size greater than the predetermined size. The flag limit_motion_estimation_flag that indicates whether the motion vector of the prediction unit having the size equal to or less than the predetermined size is used may include a Sequence Parameter Set (SPS), a Picture Parameter Set (PPS), a slice parameter, a maximum coding unit parameter, etc. When the size information about the prediction unit having the limit in motion estimation is preset in an encoder and a decoder, the size information about the prediction unit having the limit in motion estimation may not be separately added to the bitstream.

Motion vector information that is determined for each prediction unit may be included in coding information of each prediction unit and then may be transmitted from the encoder to the decoder. In another embodiment, when a motion vector of a prediction unit having a predetermined size and included in another prediction unit different from a current prediction unit is determined as a motion vector of the current prediction unit, the motion vector of the current prediction unit may be determined from the other prediction unit. Thus, motion vector information may not be required to be separately transmitted, and only flag information indicating that the motion vector of the current prediction unit is determined from the other prediction unit may be transmitted.

FIG. 23 is a flowchart of a method of encoding a video, according to an embodiment.

Referring to FIG. 23, in operation 2310, the splitter 1410 splits a picture that configures the video, by using a maximum coding unit that is a coding unit having a maximum size. In operation 2320, the splitter 1410 splits each of maximum coding units into prediction units with a hierarchical structure, according to split modes indicating split forms of the maximum coding units. As described above, the maximum coding unit may be split into deeper coding units according to depths, based on a depth indicating a total number of spatial splits of the maximum coding unit, and each of the deeper coding units according to depths may be split into prediction units for motion estimation or intra prediction.

In operation 2330, the motion estimation performing unit 1420 performs motion estimation on a prediction unit having a size equal to or less than a predetermined size from among the prediction units included in the maximum coding unit, and thus obtains a motion vector of the prediction unit having the size equal to or less than the predetermined size.

In operation S2340, the motion estimation performing unit 1420 obtains a motion vector of a prediction unit having a size greater than the predetermined size, by using the motion vector of the prediction unit having the size equal to or less than the predetermined size. As described above, for the motion vector of the prediction unit having the size greater than the predetermined size, a motion vector of a prediction unit that has the predetermined size, exists in a predetermined location, and is from among prediction units obtained by splitting the prediction unit having the size greater than the predetermined size may be used. Alternatively, for the motion vector of the prediction unit having the size greater than the predetermined size, at least one of an average value and an intermediate value of motion vectors of prediction units that have the predetermined size, exist in predetermined locations of the prediction unit having the size greater than the predetermined size, and are obtained by splitting the prediction unit having the size greater than the predetermined size, may be used.

According to exemplary embodiments, a motion estimation process for the prediction unit having the size greater than the predetermined size may be skipped, and a motion vector of a prediction unit of a lower level may be used, so that computation required for the motion estimation may be decreased. Also, during the motion estimation process for the prediction unit having the size greater than the predetermined size, a size of a memory to store data of a reference frame needs to be increased. However, according to exemplary embodiments, the motion estimation process for the prediction unit having the size greater than the predetermined size may be skipped, and thus the memory size required for the motion estimation may be decreased.

FIG. 24 is a block diagram illustrating a configuration of a motion compensating apparatus 2400, according to an embodiment. The motion compensating apparatus 2400 of FIG. 24 may correspond to the motion compensator 560 of FIG. 5.

Referring to FIG. 24, the motion compensating apparatus 2400 includes a determiner 2410 and a motion compensator 2420.

The determiner 2410 obtains, from a bitstream, flag information indicating whether a motion vector of a prediction unit having a size equal to or less than a predetermined size is used as a motion vector of a prediction unit that has a size greater than the predetermined size and is from among prediction units included in a maximum coding unit, and size information of a current prediction unit. Based on the flag information, the determiner 2410 determines whether the motion vector of the prediction unit having the size equal to or less than the predetermined size is used as the motion vector of the prediction unit having the size greater than the predetermined size. As described above, when a flag limit_motion_estimation_flag indicating whether the motion vector of the prediction unit having the size equal to or less than the predetermined size is used is 1, this may mean that motion estimation for the prediction unit having the size greater than the predetermined size is not performed, and when the flag limit_motion_estimation_flag is 0, this may mean that the motion estimation is normally performed on the prediction unit having the size greater than the predetermined size.

As a result of the determination by the determiner 2410, when it is determined that the motion vector of the prediction unit having the size equal to or less than the predetermined size is used as the motion vector of the prediction unit having the size greater than the predetermined size, when a current prediction unit is the prediction unit having the size greater than the predetermined size, the motion compensator 2420 obtains a motion vector of the current prediction unit by using the motion vector of the prediction unit having the size equal to or less than the predetermined size and from among the prediction units included in the maximum coding unit. As described above, the encoder may use, as the motion vector of the prediction unit having the size greater than the predetermined size, the motion vector of the prediction unit that has the predetermined size, exists in the predetermined location, and is from among the prediction units obtained by splitting the prediction unit having the size greater than the predetermined size. Alternatively, the encoder may use, as the motion vector of the prediction unit having the size greater than the predetermined size, at least one of the average value and the intermediate value of the motion vectors of the prediction units that have the predetermined size, exist in the predetermined locations of the prediction unit having the size greater than the predetermined size, and are obtained by splitting the prediction unit having the size greater than the predetermined size.

Alternatively, the encoder may determine, as the motion vector of the prediction unit having the size greater than the predetermined size, a motion vector of a prediction unit having the predetermined size and included in another prediction unit that is different from the prediction unit having the size greater than the predetermined size and is from among the prediction units included in the maximum coding unit. Referring to FIG. 20, the motion compensator 2420 may use a motion vector included in a bitstream, as the motion vector of the prediction unit 2010 that has the size of 64×32 and is located upper from among the two prediction units 2010 and 2020 that have the size of 64×32 and are split according to the split mode 1. To determine the motion vector of the prediction unit 2020 that has the size of 64×32 and is located lower from among the two prediction units 2010 and 2020, the motion compensator 2420 may determine, as the motion vector of the prediction unit 2020 that has the size of 64×32 and is located lower from among the two prediction units 2010 and 2020, the motion vector mv3 of the prediction unit 2032 having the size of 16×16 and located below the uppermost left corner of the prediction unit 2010 that has the size of 64×32 and is located upper from among the two prediction units 2010 and 2020.

When the motion vector of the current prediction unit is determined, the motion compensator 2420 reads data of the determined motion vector from among a plurality of pieces of data of a reference frame, and thus generates a prediction value of the current prediction unit.

Figure 25:
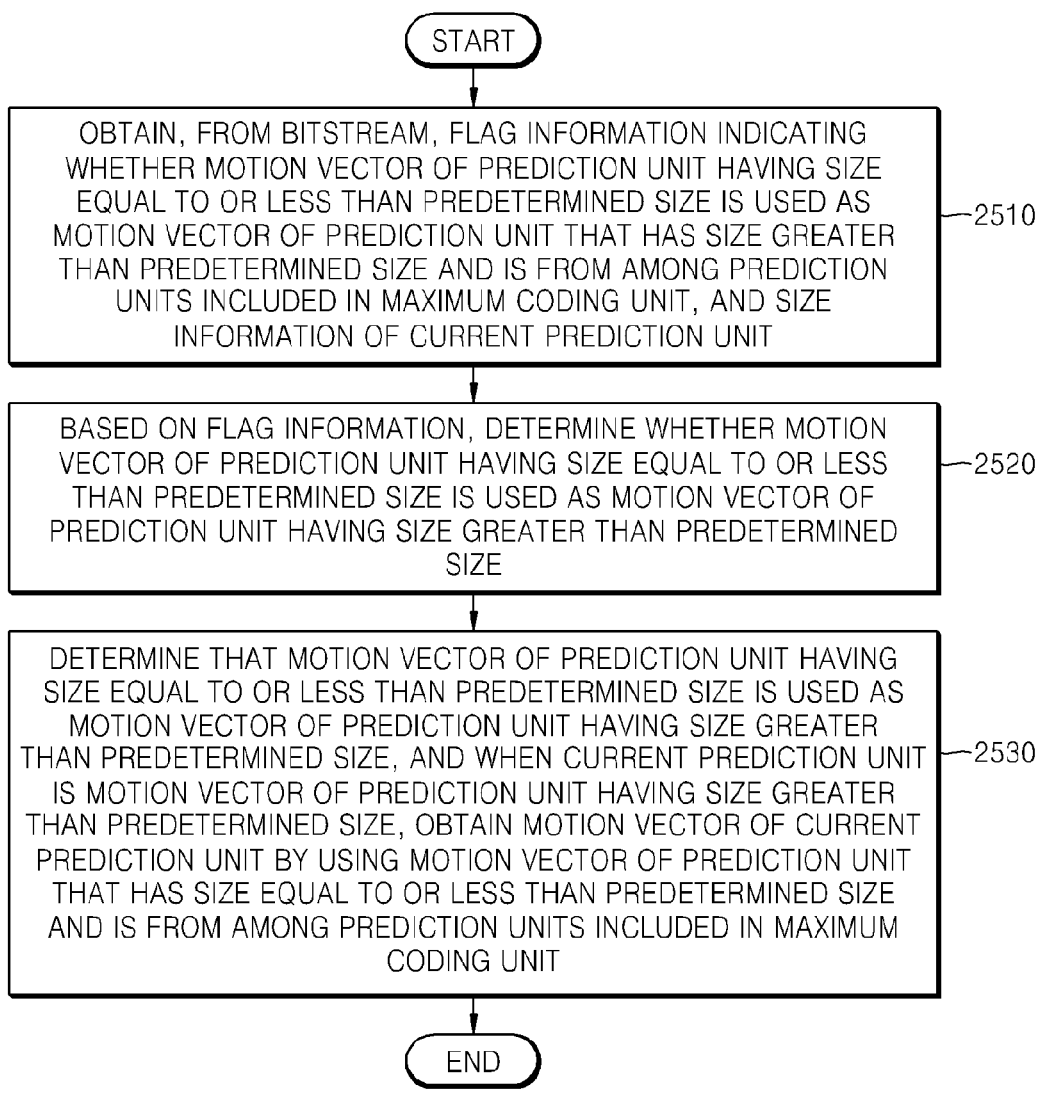
FIG. 25 is a flowchart of a method of decoding a video, according to an embodiment.

FIG. 25 is a flowchart of a method of decoding a video, according to an embodiment.

Referring to FIG. 25, in operation 2510, the determiner 2410 obtains, from a bitstream, flag information and size information of a current prediction unit. The flag information indicates whether a motion vector of a prediction unit having a size equal to or less than a predetermined size is used as a motion vector of a prediction unit that has a size greater than the predetermined size and is from among prediction units included in a maximum coding unit.

In operation 2520, based on the flag information, the determiner 2410 determines whether the motion vector of the prediction unit having the size equal to or less than the predetermined size is used as the motion vector of the prediction unit having the size greater than the predetermined size. As described above, based on a value of a flag limit_motion_estimation_flag indicating whether the motion vector of the prediction unit having the size equal to or less than the predetermined size is used, the determiner 2410 may determine whether motion estimation was performed by performing the motion estimation on the prediction unit having the size greater than the predetermined size.

In operation 2530, the motion compensator 2420 determines that the motion vector of the prediction unit having the size equal to or less than the predetermined size is used as the motion vector of the prediction unit having the size greater than the predetermined size, and when the current prediction unit is the prediction unit having the size greater than the predetermined size, the motion compensator 2420 obtains a motion vector of the current prediction unit by using the motion vector of the prediction unit that has the size equal to or less than the predetermined size and is from among prediction units included in a maximum coding unit.

As described above, according to exemplary embodiments, for the motion vector of the prediction unit having the size greater than the predetermined size, the motion vector of the prediction unit that exists in the predetermined location, has the predetermined size, and is from among the prediction units obtained by splitting the prediction unit having the size greater than the predetermined size may be used. Alternatively, for the motion vector of the prediction unit having the size greater than the predetermined size, one of the average value and the intermediate value of the motion vectors of the prediction units that have the predetermined size, exist in the predetermined locations of the prediction unit having the size greater than the predetermined size, and are obtained by splitting the prediction unit having the size greater than the predetermined size may be used. Alternatively, for the motion vector of the prediction unit having the size greater than the predetermined size, a motion vector of a prediction unit having the predetermined size and included in another prediction unit that is different from the prediction unit having the size greater than the predetermined size and is from among the prediction units included in the maximum coding unit may be used.

According to one or more exemplary embodiments, computation during motion estimation may be decreased and a video may be processed in real-time. Also, resources of hardware required for the motion estimation may be decreased.

The one or more exemplary embodiments may be embodied as computer readable codes on a computer readable recording medium. The computer readable recording medium is any data storage device that may store data which may be thereafter read by a computer system. Examples of the computer readable recording medium include read-only memory (ROM), random-access memory (RAM), compact disc read-only memories (CD-ROMs), magnetic tapes, floppy disks, optical data storage devices, etc. The computer readable recording medium may also be distributed over network coupled computer systems so that the computer readable code is stored and executed in a distributed fashion.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A method of encoding a video, the method comprising, by using at least one hardware processor:
splitting a picture included in the video, by using a maximum coding unit that is a coding unit having a maximum size;
splitting the maximum coding unit into prediction units in a hierarchical structure, according to a split mode indicating a split form of the maximum coding unit;
performing motion estimation on a prediction unit having a size equal to or less than a predetermined size from among the prediction units included in the maximum coding unit and obtaining a motion vector of the prediction unit having the size equal to or less than the predetermined size; and
obtaining a motion vector of a prediction unit having a size greater than the predetermined size, by using the motion vector of the prediction unit having the size equal to or less than the predetermined size,
wherein the obtaining the motion vector of the prediction unit having the size greater than the predetermined size comprises determining, as the motion vector of the prediction unit having the size greater than the predetermined size, at least one from among an average value and an intermediate value of motion vectors of prediction units that have the predetermined size, exist in predetermined locations of the prediction unit having the size greater than the predetermined size, and are obtained by splitting the prediction unit having the size greater than the predetermined size.

2. The method of claim 1, wherein the splitting the maximum coding unit comprises splitting the maximum coding unit into coding units according to depths, based on a depth indicating a total number of spatial splits of the maximum coding unit, and each of the coding units according to depths is split into the prediction units for motion estimation.

3. The method of claim 1, wherein the predetermined locations of the prediction unit having the size greater than the predetermined size correspond to an upper left corner of the prediction unit having the size greater than the predetermined size.

4. The method of claim 1, wherein the obtaining the motion vector of the prediction unit having the size greater than the predetermined size further comprises determining, as the motion vector of the prediction unit having the size greater than the predetermined size, a motion vector of a prediction unit having the predetermined size and included in another prediction unit that is different from the prediction unit having the size greater than the predetermined size, and is from among the prediction units included in the maximum coding unit.

5. A method of decoding a video, the method comprising, by using at least one hardware processor:
obtaining, from a bitstream, flag information indicating whether a motion vector of a prediction unit having a size equal to or less than a predetermined size is used in obtaining a motion vector of a prediction unit that has a size greater than the predetermined size and is from among prediction units included in a maximum coding unit, and size information of a current prediction unit;
determining whether the motion vector of the prediction unit having the size equal to or less than the predetermined size is used in obtaining the motion vector of the prediction unit having the size greater than the predetermined size based on the flag information; and
when the motion vector of the prediction unit having the size equal to or less than the predetermined size is used in obtaining the motion vector of the prediction unit having the size greater than the predetermined size, and when the current prediction unit is the prediction unit having the size greater than the predetermined size, obtaining a motion vector of the current prediction unit by using at least one from among an average value and an intermediate value of motion vectors of prediction units that have the predetermined size, exist in predetermined locations of the prediction unit having the size greater than the predetermined size, and are obtained by splitting the prediction unit having the size greater than the predetermined size.

6. The method of claim 5, wherein the maximum coding unit is split into coding units according to depths in a hierarchical structure, based on a depth indicating a total number of spatial splits, and each of the coding units according to depths is split into the prediction units for motion estimation.

7. The method of claim 5, wherein the obtaining the motion vector further comprises determining, as the motion vector of the current prediction unit, a motion vector of a prediction unit having the predetermined size and included in another prediction unit that is different from the current prediction unit and is from among prediction units included in a maximum coding unit equal to the current prediction unit.

8. An image encoder for encoding a video, the image encoder comprising at least one hardware processor to implement:
 a splitter configured to split a picture included in the video, by using a maximum coding unit that is a coding unit having a maximum size, and splitting the maximum coding unit into prediction units in a hierarchical structure, according to a split mode indicating a split form of the maximum coding unit; and
 a motion estimation performing unit configured to perform motion estimation on a prediction unit having a size equal to or less than a predetermined size from among the prediction units included in the maximum coding unit, configured to obtain a motion vector of the prediction unit having the size equal to or less than the predetermined size, and configured to obtain a motion vector of a prediction unit having a size greater than the predetermined size, by using the motion vector of the prediction unit having the size equal to or less than the predetermined size,
 wherein the motion estimation performing unit determines, as the motion vector of the prediction unit having the size greater than the predetermined size, at least one from among an average value and an intermediate value of motion vectors of prediction units that have the predetermined size, exist in predetermined locations of the prediction unit having the size greater than the predetermined size, and are obtained by splitting the prediction unit having the size greater than the predetermined size.

9. The image encoder of claim 8, wherein the splitter splits the maximum coding unit into coding units according to depths, based on a depth indicating a total number of spatial splits of the maximum coding unit, and splits each of the coding units according to depths into the prediction units for motion estimation.

10. An image decoder for decoding a video, the image decoder comprising:
 a determiner configured to obtain, from a bitstream, flag information indicating whether a motion vector of a prediction unit having a size equal to or less than a predetermined size is used in obtaining a motion vector of a prediction unit that has a size greater than the predetermined size and is from among prediction units included in a maximum coding unit, and size information of a current prediction unit, and based on the flag information, configured to determine whether the motion vector of the prediction unit having the size equal to or less than the predetermined size is used in obtaining the motion vector of the prediction unit having the size greater than the predetermined size; and
 a motion compensator configured to, according to a result of the determining, when the motion vector of the prediction unit having the size equal to or less than the predetermined size is used in obtaining the motion vector of the prediction unit having the size greater than the predetermined size, and when the current prediction unit is the prediction unit having the size greater than the predetermined size, obtain a motion vector of the current prediction unit by using at least one from among an average value and an intermediate value of motion vectors of prediction units that have the predetermined size, exist in predetermined locations of the prediction unit having the size greater than the predetermined size, and are obtained by splitting the prediction unit having the size greater than the predetermined size.

11. The image decoder of claim 10, wherein the maximum coding unit is split into coding units according to depths in a hierarchical structure, based on a depth indicating a total number of spatial splits, and each of the coding units according to depths is split into the prediction units for motion estimation and compensation.

12. The image decoder of claim 10, wherein the motion compensator further determines, as the motion vector of the current prediction unit, a motion vector of a prediction unit having the predetermined size and included in another prediction unit that is different from the current prediction unit and is from among the prediction units included in the maximum coding unit equal to the current prediction unit.

* * * * *